(12) United States Patent
Shoji et al.

(10) Patent No.: US 6,973,020 B2
(45) Date of Patent: Dec. 6, 2005

(54) RECORDING MEDIUM, METHOD AND APPARATUS FOR REPRODUCING, AND METHOD AND APPARATUS FOR RECORDING

(75) Inventors: Mamoru Shoji, Osaka (JP); Atsushi Nakamura, Osaka (JP); Takashi Ishida, Kyoto (JP); Yuji Hisakado, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 598 days.

(21) Appl. No.: 10/221,329

(22) PCT Filed: Apr. 16, 2001

(86) PCT No.: PCT/JP01/03258

§ 371 (c)(1),
(2), (4) Date: Sep. 10, 2002

(87) PCT Pub. No.: WO01/80227

PCT Pub. Date: Oct. 25, 2001

(65) Prior Publication Data

US 2003/0031098 A1    Feb. 13, 2003

(30) Foreign Application Priority Data

Apr. 17, 2000   (JP) .............................. 2000-114861

(51) Int. Cl.$^7$ ................................................ G11B 7/24
(52) U.S. Cl. ................................ 369/275.1; 369/275.4; 369/283; 369/47.27; 369/94
(58) Field of Search ........................... 369/272, 275.1, 369/275.3, 275.4, 283, 47.1, 47.15, 47.21, 369/47.22, 47.27, 53.1, 53.2, 53.41, 59.1, 369/59.25, 93, 94

(56) References Cited

U.S. PATENT DOCUMENTS 5,084,860 A * 1/1992 Maeda et al. ............. 369/275.3
5,991,259 A * 11/1999 Nakayama et al. ....... 369/275.4
6,046,968 A * 4/2000 Abramovitch et al. ... 369/47.28

FOREIGN PATENT DOCUMENTS

JP         2000-322742         11/2000

* cited by examiner

Primary Examiner—Muhammad Edun
(74) Attorney, Agent, or Firm—Renner, Otto, Boisselle & Sklar, LLP

(57) ABSTRACT

In a recording medium which is circular and has first and second recording layers, the first and second recording layers each include one or more first tracks extending concentrically or spirally and one or more second tracks extending concentrically or spirally, each of the one or more first tracks and the one or more second tracks includes a plurality of first sectors and a plurality of second sectors, each of the plurality of first sectors includes first and second regions, each of the plurality of second sectors includes third and fourth regions, first and second grooves are formed in each of the second and fourth regions, the first and second grooves extending concentrically or spirally and oscillating sinusoidally, oscillation of the first groove has a first oscillation characteristic at a first prescribed position in the second region, oscillation of the second groove has a second oscillation characteristic at a second prescribed position in the fourth region, and the first and second oscillation characteristics are different from each other.

27 Claims, 30 Drawing Sheets

FIG.23
First layer
Groove track
Land track
Groove track
Land track
Groove track
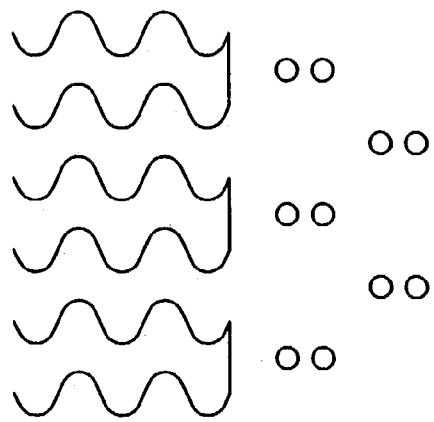
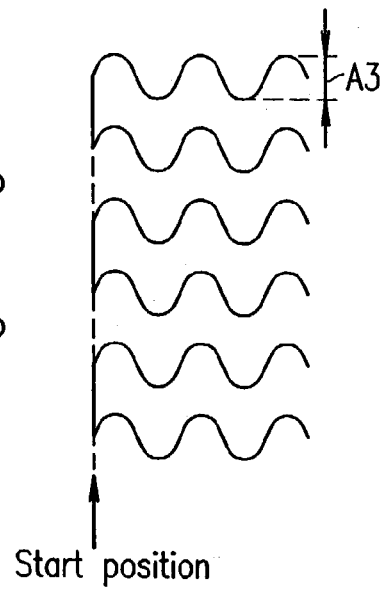
A3
Start position
Second layer
Groove track
Land track
Groove track
Land track
Groove track
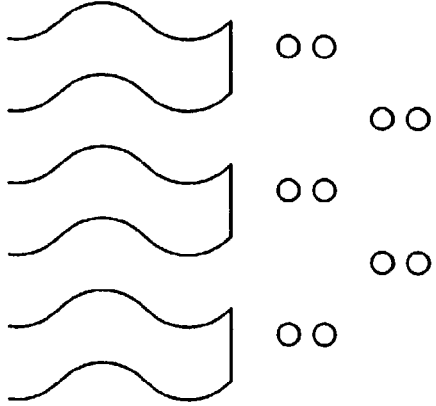
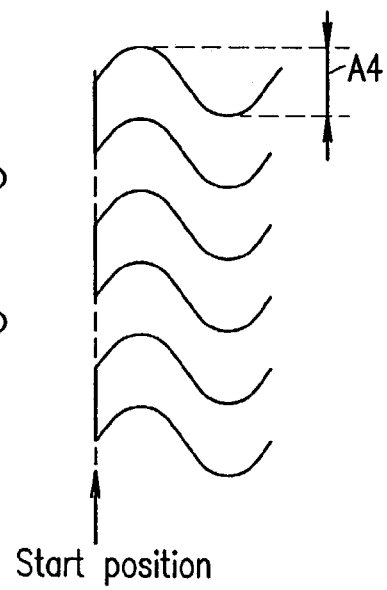
A4
Start position First layer C Second layer C

FIG. 30
Optical characteristics of first recording layer 2103
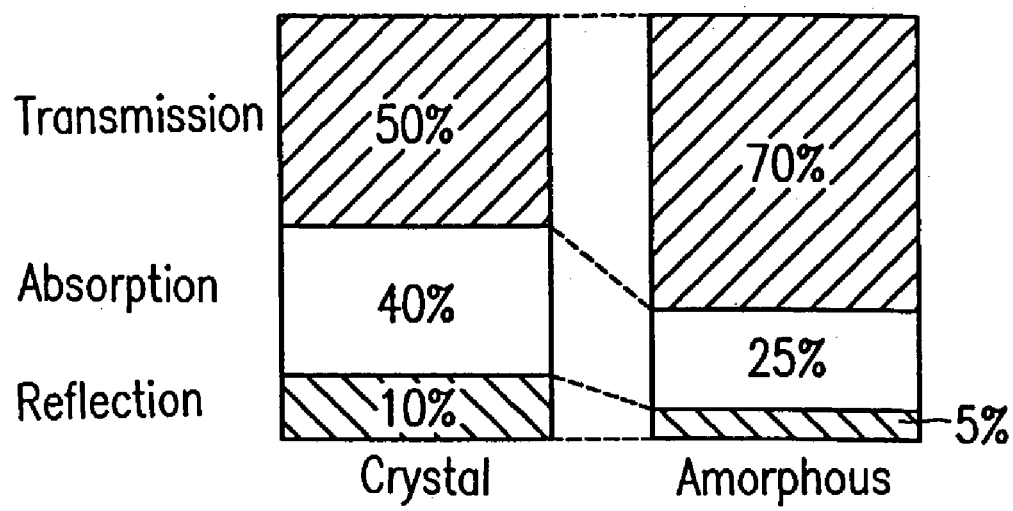
Optical characteristics of Second recording layer 2105
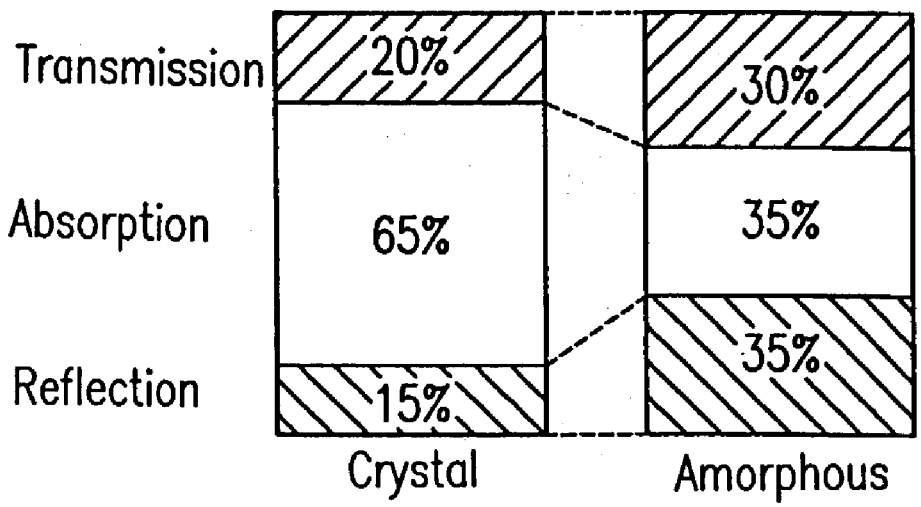

RECORDING MEDIUM, METHOD AND APPARATUS FOR REPRODUCING, AND METHOD AND APPARATUS FOR RECORDING

TECHNICAL FIELD

The present invention relates to a recording medium on/from which information is recorded/reproduced when irradiated with a light beam, and particularly to a multilayered optical disk having a plurality of laminated recording layers on/from which information is recorded/reproduced when irradiated with a light beam from a specific surface of the disk.

BACKGROUND ART

Recently, a variety of optical disks on/from which a large quantity of information can be recorded/reproduced have been developed. An example of large capacity optical disks is a double-sided optical disk in which two optical disk pieces are attached together and information can be recorded/reproduced on/from either side of the disk. However, in the field which frequently requires random access, for example, recording mediums for use with computers or game machines, there is a demand that the optical disk has a large recording capacity while any data in the disk can be accessed without turning the disk over.

Therefore, as an optical disk on which a large quantity of data can be recorded and in which random access can be performed, a multilayered optical disk in which there are two or more recording layers and information can be recorded/reproduced on/from one side of the disk has been suggested. FIG. 29 shows an example of such a disk.

FIG. 29 is a cross-sectional view of an optical disk 2300 having two recording layers. In FIG. 29, reference numerals 2101 and 2102 respectively denote transparent first and second substrates of polycarbonate or the like, reference numeral 2103 denotes a first recording layer, reference numeral 2104 denotes a semitransparent reflection film which transmits or reflects a laser beam incident on the first substrate 2101, reference numeral 2105 denotes a second recording layer, reference numeral 2106 denotes a reflection film which reflects a laser beam 2301 incident on the first substrate 2101, and reference numeral 2107 denotes an adhesive for attaching the substrates 2101 and 2102 which has the property of transmitting light. This structure makes it possible to perform a recording/reproducing operation on either of the recording layers 2103 or 2105 with the laser beam 2301 incident on the disk from the side of the substrate 2101.

Next, FIG. 30 is referenced. FIG. 30 is a diagram illustrating optical characteristics of the optical disk 2300 having the two recording layers 2103 and 2105 shown in FIG. 29. Here, a phase change material is considered to be used for the recording layers. A recording operation on the phase change material is performed by irradiating a disk being rotating with a light beam from a semiconductor laser so as to heat and resolve a recording layer of the disk. The temperature that the recording layer reaches and a process for cooling the recording layer vary depending on the strength of intensity of the light beam, thereby causing a phase change in the recording layer.

When the intensity of the light beam is strong, the recording layer is rapidly cooled from its high temperature state so as to be brought into an amorphous state, and when the intensity of the light beam is relatively weak, the recording layer is gradually cooled from a middle or high temperature state so as to be crystallized. Portions which are brought into the amorphous state are generally referred to as a mark, and crystallized portions between marks are generally referred to as a space. Binarized information is recorded on the mark and space. In the reproducing operation, the recording layer is irradiated with a weak light beam to such an extent as not to undergo a phase change and a difference in quantity of reflection light between the mark and space portions is detected so as to obtain a reproduced signal.

As shown in FIG. 30, the first recording layer 2103 is designed such that the occupancy of a transmission coefficient is high, i.e., a high transmission coefficient design, and the second recording layer 2105 is designed such that the occupancy of an absorption coefficient is high, i.e., a high absorption coefficient design. In this manner, generally in the dual-layer optical disk having two recording layers, the first and second recording layers 2103 and 2105 have different characteristics.

As described above, since the recording layer characteristics of the first and second recording layers 2103 and 2105 are different, optimal recording/reproducing conditions of the first and second recording layers are different. As an example, the reproducing condition of the second recording layer 2105 is described.

In general, in order to record/reproduce data, a recordable optical disk requires data management for each sector, regardless of a single-layer disk or a multilayered disk. Therefore, it often happens that guiding grooves for a tracking operation of a servo means are formed in a disk production process and along with this, address information of sectors is formed as pits. A sector structure of the second substrate 2102 of the dual-layer optical disk is illustrated in FIG. 31.

In FIG. 31, reference numeral 2102 denotes a second substrate, reference numeral 2302 denotes a groove track, reference numeral 2301 denotes a land track between grooves, reference numeral 2303 denotes an address region including concave and convex pits, reference numeral 2304 denotes a data region, and the address regions 2303 and the data regions 2304 are provided in both the land track 2301 and the groove track 2302.

Next, FIG. 32 is referenced. FIG. 32 provides more detailed illustration of the vicinity of the address region 2303 of the second substrate 2102. As illustrated in FIG. 32, the groove track 2302 sinusoidally oscillates at a constant frequency and the address regions 2303 are provided in both the land track 2301 and the groove track 2302. The address region 2303 is a region exclusively used for reproduction and is usually in a crystal state. This results from the fact that the optical characteristic of the recording layer is unstable immediately after the recording layer is formed, and therefore the address region 2303 and the data region 2304 are irradiated with a laser beam so as to be brought into a uniform crystal state.

In the case of reproducing data from the address region 2303 of such a dual-layer optical disk 2300, when the data is reproduced from the first recording layer 2013, as illustrated in FIG. 30, since the first recording layer 2013 has a reflection coefficient of 10% at the crystal state, up to 10% of the quantity of light returns to a photodetector. However, when the data is reproduced from the second recording layer 2015, the light is required to pass through the first recording layer 2013 having a transmission coefficient of 50% in both directions, and therefore, in fact, only 3.75% of the quantity of the light returns to the photodetector, although the reflection coefficient of the second recording layer 2105 is 15%, which is greater than that of the first recording layer.

Accordingly, in order to reproduce data from the address region at an equivalent signal-to-noise ratio, irradiation power of a light beam in the case of reproducing data from the second recording layer 2105 is required to be set so as to be larger than that of the light beam in the case of reproducing data from the first recording layer 2103. However, in the case where the irradiation power capable of reproducing data from the second recording layer 2105 is preset, when a focusing operation of a servo means or a tracking operation of the servo means is erroneously performed on the first recording layer 2013, there is a risk that data recorded on the first recording layer 2013 might be erased due to the excessively large irradiation power.

On the contrary, in the case of setting the irradiation power sufficiently small as to reproduce data from the first recording layer 2013, when the address information cannot be reproduced, there is a risk in determining that the servo means is performing an operation on the second recording layer 2105 and immediately increasing the irradiation power. This is because there are some cases where the servo means is actually performing an operation on the first recording layer 2013, rather than the second recording layer 2105. Therefore, it is necessary to check on a number of things, such as optimization of the reproducing conditions, reproducing operations on a plurality of regions, etc., before increasing the irradiation power.

Further, it is not possible to securely discriminate between the first and second recording layers 2013 and 2015 by observing a focus error signal or a focus sum signal in which two elemental signals included in the focus error signal. As described above, when there is a difference between the first and second recording layers 2013 and 2015 with respect to the irradiation power used for a reproducing operation, it is necessary to discriminate between the first and second recording layers 2013 and 2015 more securely.

An objective of the present invention is to provide a recording medium in which a plurality of recording layers are securely identified in a short period of time.

DISCLOSURE OF THE INVENTION

In a recording medium which is circular and has first and second recording layers according to the present invention, the first and second recording layers each include first and second tracks extending concentrically or spirally, the first and second tracks each include first and second sectors, the first sector includes first and second regions, the second sector includes third and fourth regions, first and second grooves are formed in each of the second and fourth regions, the first and second grooves extending concentrically or spirally and oscillating sinusoidally, oscillation of the first groove has a first oscillation characteristic at a first prescribed position in the second region, oscillation of the second groove has a second oscillation characteristic at a second prescribed position in the fourth region, and the first and second oscillation characteristics are different from each other. Thus, the above-described objective is achieved.

The first oscillation characteristic may include a first phase and the second oscillation characteristic may include a second phase.

The first and second phases may be different from each other by substantially 180 degrees.

The oscillations of the first and second grooves may respectively have a minimum amplitude at the first and second prescribed positions.

The oscillations of the first and second grooves may respectively have a maximum amplitude at the first and second prescribed positions.

Readout light may be incident on the first and second recording layers from the same incident surface.

The first track may further include a third sector, the second track may further include a fourth sector, the first region included in the first sector may be a first address region, the third region included in the second sector may be a second address region, the third sector may include a third address region, the fourth sector may include a fourth address region, the first and third sectors may form a first address block, the second and fourth sectors may form a second address block, the first address block may have first address information representing an address of the first address block, the first address information may be formed by combining a first code recorded in the first address region and a second code recorded in the third address region, the second address block may have second address information representing an address of the second address block, and the second address information may be formed by combining a third code recorded in the second address region and a fourth code recorded in the fourth address region.

The first oscillation characteristic may include a first cycle and the second oscillation characteristic may include a second cycle.

Readout light may be incident on the first and second recording layers from the same incident surface, a distance between the first recording layer and the incident surface may be greater than a distance between the second recording layer and the incident surface, and the first cycle may be greater than the second cycle.

The first oscillation characteristic may include a first amplitude and the second oscillation characteristic may include a second amplitude.

Readout light may be incident on the first and second recording layers from the same incident surface, a distance between the first recording layer and the incident surface may be greater than a distance between the second recording layer and the incident surface, and the first amplitude may be greater than the second amplitude.

The first region may include an address region in which information representing an address of the first sector is recorded and the third region may include an address region in which information representing an address of the second sector is recorded.

The first region may include a first pit region representing an end of the first sector and the third region may include a second pit region representing an end of the second sector.

The first groove may have a first inner circumference sidewall formed on an inner circumference side of the recording medium and a first outer circumference sidewall formed on an outer circumference side of the recording medium, the second groove may have a second inner circumference sidewall formed on the inner circumference side of the recording medium and a second outer circumference sidewall formed on the outer circumference side of the recording medium, the first pit region may be provided at on the side surface of the first inner circumference sidewall, and the second pit region may be provided on the side surface of the second outer circumference sidewall.

In a recording medium which is circular and has first and second recording layers according to the present invention, the first and second recording layers each include first and second tracks extending concentrically or spirally, the first and second tracks each include first and second sectors, the first and second sectors each include first and second pit regions respectively representing ends of the first and second sectors and first and second data regions, first and second grooves are formed in each of the first and second data regions, the first and second grooves extending concentrically or spirally and oscillating sinusoidally, the first groove includes a first inner circumference sidewall formed at an inner circumference side and a first outer circumference sidewall formed at an outer circumference side, the second groove includes a second inner circumference sidewall formed at the inner circumference side and a second outer circumference sidewall formed at the outer circumference side, the first pit region is provided on the side surface of the first inner circumference sidewall, and the second pit region is provided on the side surface of the second outer circumference sidewall. Thus, the above-described objective is achieved.

In a reproducing apparatus for reproducing data from a recording medium which is circular and has first and second recording layers according to the present invention, the first and second recording layers each include first and second tracks extending concentrically or spirally, the first and second tracks each include first and second sectors, the first sector includes first and second regions, the second sector includes third and fourth regions, first and second grooves are formed in each of the second and fourth regions, the first and second grooves extending concentrically or spirally while oscillating sinusoidally, oscillation of the first groove has a first oscillation characteristic at a first prescribed position in the second region, oscillation of the second groove has a second oscillation characteristic at a second prescribed position in the fourth region, the first and second oscillation characteristics are different from each other, and the reproducing apparatus includes: an optical head for irradiating the recording medium with a laser beam and receiving light reflected from one of the first and second grooves so as to generate an electric signal corresponding to the reflection light; a signal generation means for generating a tracking error signal and a reproduced signal based on the electric signal; a signal process means for processing the reproduced signal; a wobble signal extraction means for extracting a wobble signal from the tracking error signal; and a discrimination means for discriminating, based on the wobble signal, whether the reflection light is light reflected from the first groove or light reflected from the second groove. Thus, the above-described objective is achieved.

The first oscillation characteristic may include a first phase and the second oscillation characteristic may include a second phase.

The first and second phases may be different from each other by substantially 180 degrees.

The oscillations of the first and second grooves may respectively have a minimum amplitude at the first and second prescribed positions.

The oscillations of the first and second grooves may respectively have a maximum amplitude at the first and second prescribed positions.

Readout light may be incident on the first and second recording layers from the same incident surface.

The first track may further include a third sector, the second track may further include a fourth sector, the first region included in the first sector may be a first address region, the third region included in the second sector may be a second address region, the third sector may include a third address region, the fourth sector may include a fourth address region, the first and third sectors may form a first address block, the second and fourth sectors may form a second address block, the first address block may have first address information representing an address of the first address block, the first address information may be formed by combining a first code recorded in the first address region and a second code recorded in the third address region, the second address block may have second address information representing an address of the second address block, and the second address information may be formed by combining a third code recorded in the second address region and a fourth code recorded in the fourth address region.

The first oscillation characteristic may include a first cycle and the second oscillation characteristic may include a second cycle.

Readout light may be incident on the first and second recording layers from the same incident surface, a distance between the first recording layer and the incident surface may be greater than a distance between the second recording layer and the incident surface, and the first cycle may be greater than the second cycle.

In a reproduction method for reproducing data from a recording medium which is circular and has first and second recording layers according to the present invention, the first and second recording layers each include first and second tracks extending concentrically or spirally, the first and second tracks each include first and second sectors, the first sector includes first and second regions, the second sector includes third and fourth regions, first and second grooves are formed in each of the second and fourth regions, the first and second grooves extending concentrically or spirally and oscillating sinusoidally, oscillation of the first groove has a first oscillation characteristic at a first prescribed position in the second region, oscillation of the second groove has a second oscillation characteristic at a second prescribed position in the fourth region, the first and second oscillation characteristics are different from each other, and the reproduction method includes the steps of: irradiating the recording medium with a laser beam and receiving light reflected from one of the first and second grooves so as to generate an electric signal corresponding to the reflection light; generating a tracking error signal and a reproduced signal based on the electric signal; processing the reproduced signal; extracting a wobble signal from the tracking error signal; and discriminating, based on the wobble signal, whether the reflection light is light reflected from the first groove or light reflected from the second groove. Thus, the above-described objective is achieved.

In a recording apparatus for recording data on a recording medium which is circular and has first and second recording layers according to the present invention, the first and second recording layers each include first and second tracks extending concentrically or spirally, the first and second tracks each include first and second sectors, the first sector includes first and second regions, the second sector includes third and fourth regions, first and second grooves are formed in each of the second and fourth regions, the first and second grooves extending concentrically or spirally and oscillating sinusoidally, oscillation of the first groove has a first oscillation characteristic at a first prescribed position in the second region, oscillation of the second groove has a second oscillation characteristic at a second prescribed position in the fourth region, the first and second oscillation characteristics are different from each other, and the recording apparatus includes: an optical head for irradiating the recording medium with a laser beam and receiving light reflected from one of the first and second grooves so as to generate an electric signal corresponding to the reflection light; a signal generation means for generating a tracking error signal and a reproduced signal based on the electric signal; a wobble signal extraction means for extracting a wobble signal from the tracking error signal; a discrimination means for discriminating, based on the wobble signal, whether the reflection light is light reflected from the first groove or light reflected from the second groove; and a recording signal generation means for generating a recording signal, wherein the optical head records the recording signal generated by the recording signal generation means on the recording medium. Thus, the above-described objective is achieved.

In a recording method for recording data on a recording medium which is circular and has first and second recording layers according to the present invention, the first and second recording layers each include first and second tracks extending concentrically or spirally, the first and second tracks each include first and second sectors, the first sector includes first and second regions, the second sector includes third and fourth regions, first and second grooves are formed in each of the second and fourth regions, the first and second grooves extending concentrically or spirally and oscillating sinusoidally, oscillation of the first groove has a first oscillation characteristic at a first prescribed position in the second region, oscillation of the second groove has a second oscillation characteristic at a second prescribed position in the fourth region, the first and second oscillation characteristics are different from each other, and the recording method includes the steps of: irradiating the recording medium with a laser beam and receiving light reflected from one of the first and second grooves so as to generate an electric signal corresponding to the reflection light; generating a tracking error signal based on the electric signal; extracting a wobble signal from the tracking error signal; discriminating, based on the wobble signal, whether the reflection light is light reflected from the first groove or light reflected from the second groove; generating a recording signal; and recording the generated recording signal on the recording medium. Thus, the above-described objective is achieved.

BRIEF DESCRIPTION OF THE DRAWINGS

FIG. 23 is a diagram for explaining the oscillation of grooves formed in another optical disk according to Embodiment 2.

FIG. 30 is a diagram for explaining optical characteristics of an optical disk.

BEST MODE FOR CARRYING OUT THE INVENTION

Hereinafter, a recording medium according to embodiments of the present invention will be described with reference to the drawings.

(Embodiment 1)

Figure 1:
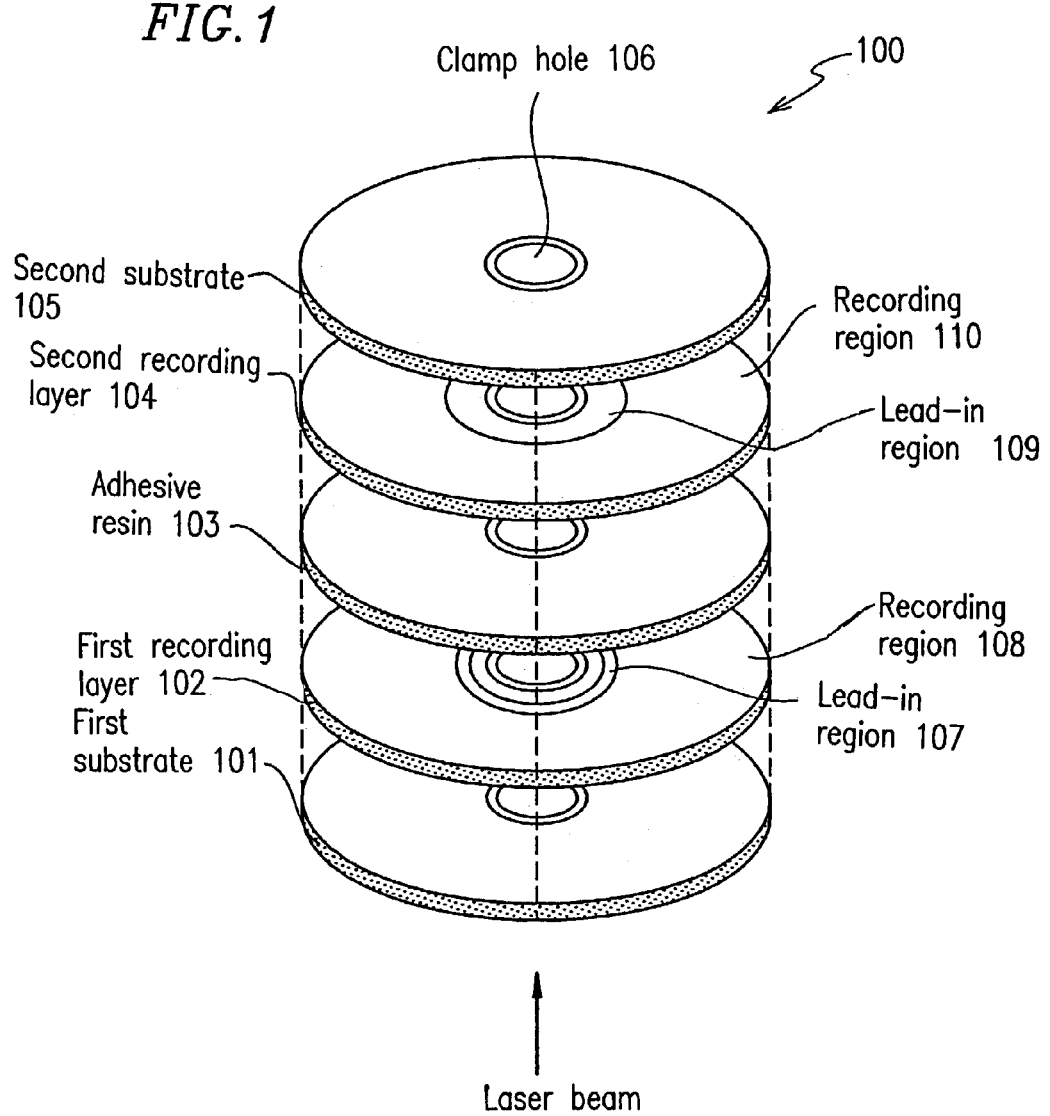
FIG. 1 is a structural diagram of an optical disk according to Embodiment 1 of the present invention.

FIG. 1 is a structural diagram of an optical disk 100 according to Embodiment 1 of the present invention. In FIG. 1, the optical disk 100 includes a first substrate 101, a first recording layer 102, an adhesive resin 103, a second recording layer 104 and a second substrate 105. The first substrate 101, the first recording layer 102, the adhesive resin 103, the second recording layer 104 and the second substrate 105 have their respective clamp holes 106. The first recording layer 102 includes a lead-in region 107 and a recording region 108. The second recording layer 104 includes a lead-in region 109 and a recording region 110. The first and second substrates 101 and 105 are formed of a polycarbonate resin or the like and respectively protect the first and second recording layers 102 and 104.

Figure 2:
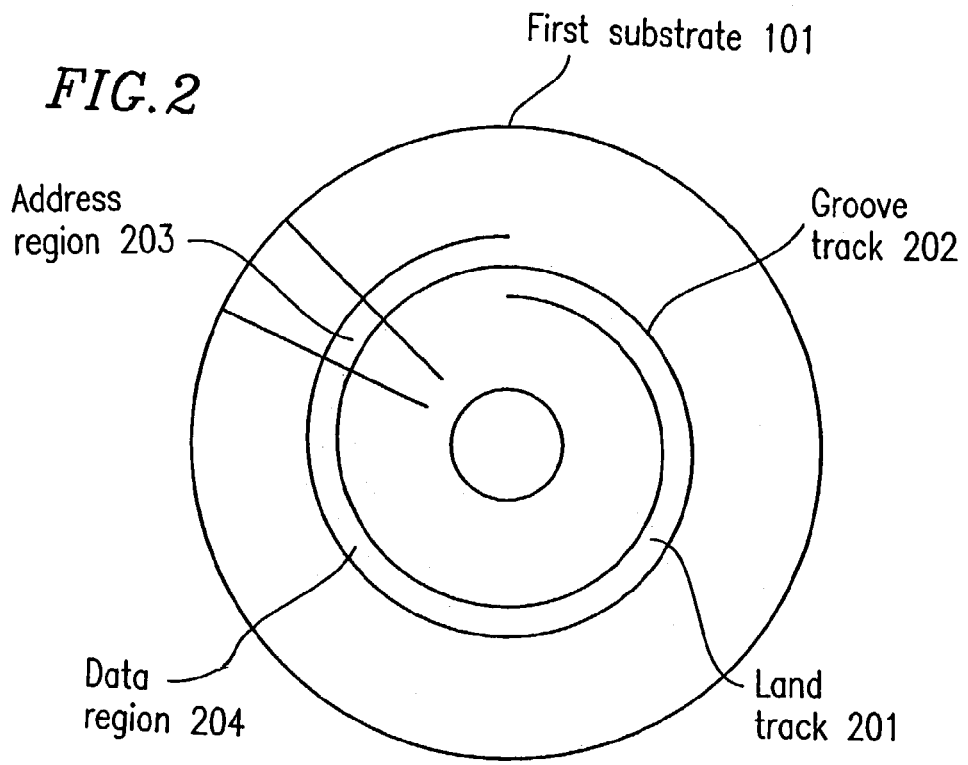
FIG. 2 is a plan view of a first substrate included in the optical disk according to Embodiment 1.

Next, FIG. 2 is referenced. FIG. 2 illustrates a sector structure on the first substrate 101 included in the optical disk 100 shown in FIG. 1. The first substrate 101 is provided with groove tracks 202 and land tracks 201 which are formed between the groove tracks 202. The groove tracks 202 and the land tracks 201 spirally extend and sinusoidally oscillate (hereinafter, the sinusoidal oscillation is referred to as "wobbling"). Information is recorded on both the groove tracks 202 and the land tracks 201, and each of the groove tracks 202 and the land tracks 201 includes one or more address regions 203 and a data region 204.

When each of the groove tracks 202 and the land tracks 201 is divided into a plurality of sectors, an address region 203 and a data region 204 are allocated to each sector. In this case, each address region 203 is also referred to as a sector address region. With respect to a track structure, the land tracks 201 and the groove tracks 202 can be continuously and spirally connected to each other every other circuit.

Figure 3:
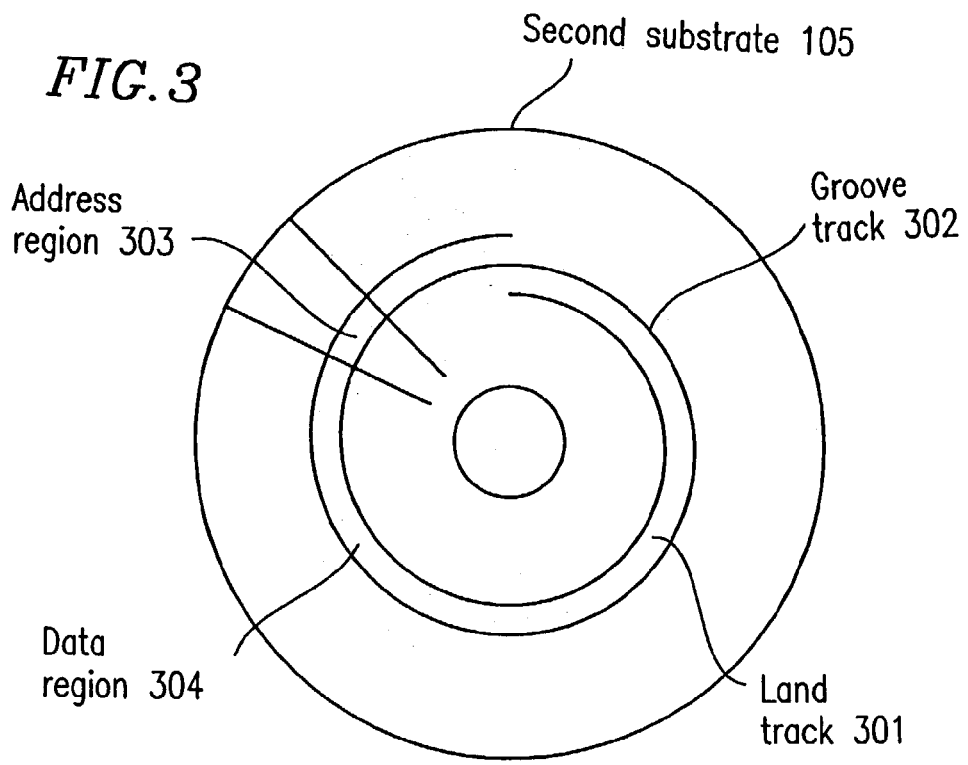
FIG. 3 is a plan view of a second substrate included in the optical disk according to Embodiment 1.

Next, FIG. 3 is referenced. FIG. 3 illustrates a sector structure on the second substrate 105 included in the optical disk 100 shown in FIG. 1. The second substrate 105 is provided with groove tracks 302 and land tracks 301 which are formed between the groove tracks 302. The groove tracks 302 and the land tracks 301 extend and wobble. Information is recorded on both the groove tracks 302 and the land tracks 301, and each of the groove tracks 302 and the land tracks 301 includes one or more address regions 303 and a data region 304.

When each of the groove tracks 302 and the land tracks 301 is divided into a plurality of sectors, an address region 303 and a data region 304 are allocated to each sector. In this case, each address region 303 is also referred to as a sector address region. With respect to a track structure, the land tracks 301 and the groove tracks 302 can be continuously and spirally connected to each other every other circuit.

Figure 4:
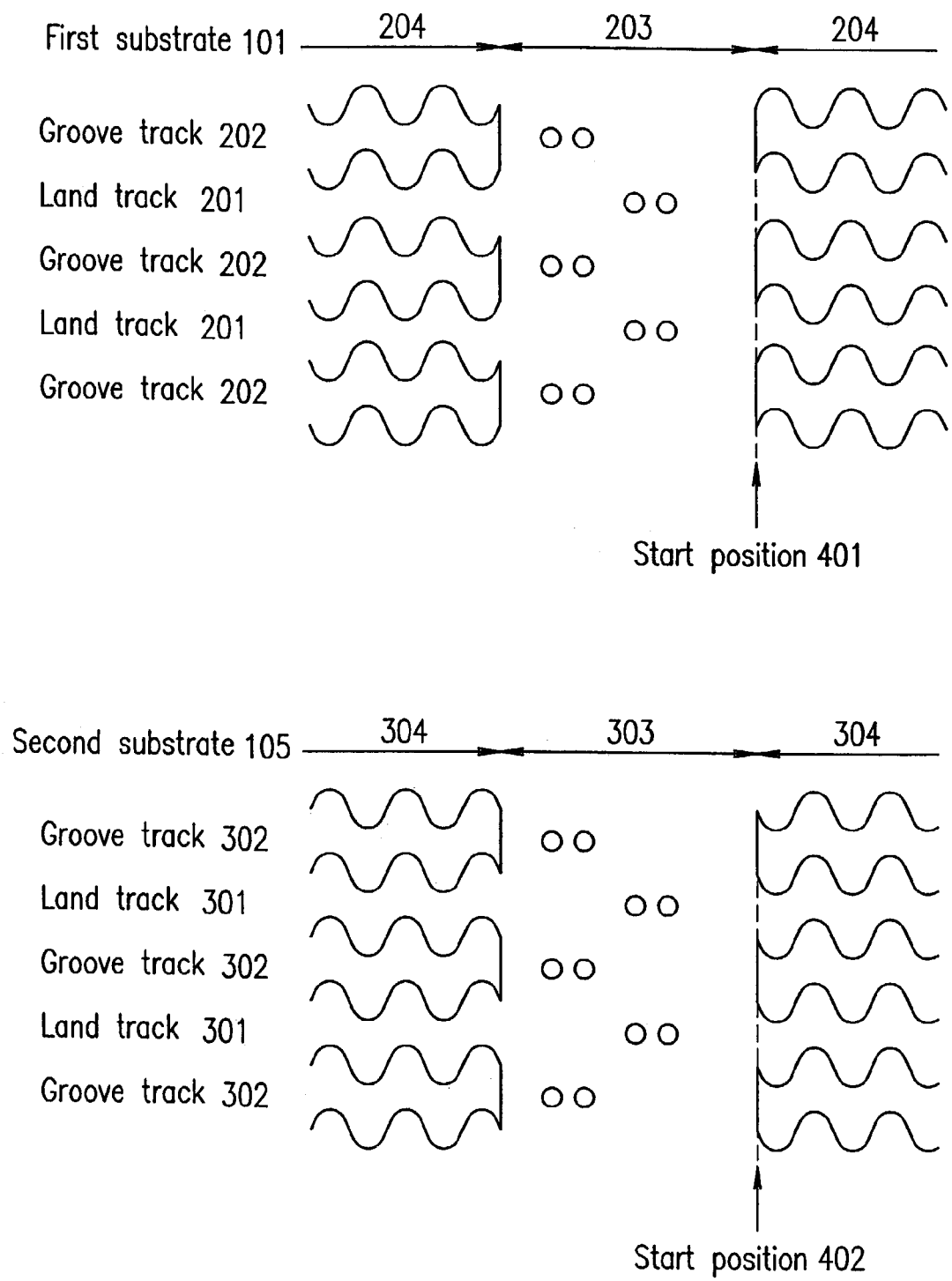
FIG. 4 is a diagram for explaining the oscillation of grooves formed in the optical disk according to Embodiment 1.

Next, FIG. 4 is referenced. FIG. 4 provides more detailed illustration of the vicinity of the address region 203 of the first substrate 101 and the vicinity of the address region 303 of the second substrate 105. The address regions 203 each representing an address of a sector are allocated to the groove tracks 202 and the land tracks 201, and the address regions 303 each representing an address of a sector are allocated to the groove tracks 302 and the land tracks 301. As shown in FIG. 4, in the first substrate 101, a phase of the oscillation of each groove track 202 at a start position 401 in the data region 204 is at zero degrees.

On the other hand, as shown in FIG. 4, in the second substrate 105, a phase of the oscillation of each groove track 302 at a start position 402 in the data region 304 is at 180 degrees. That is, in the first and second substrates 101 and 105, phases of the oscillation of the tracks at the start positions 401 and 402 in the data regions are different from each other. By detecting the difference in the phase of the oscillation, it is possible to securely discriminate whether the servo means is performing an operation for controlling a light beam on the first or second substrates 101 or 105 in a short period of time.

Figure 5:
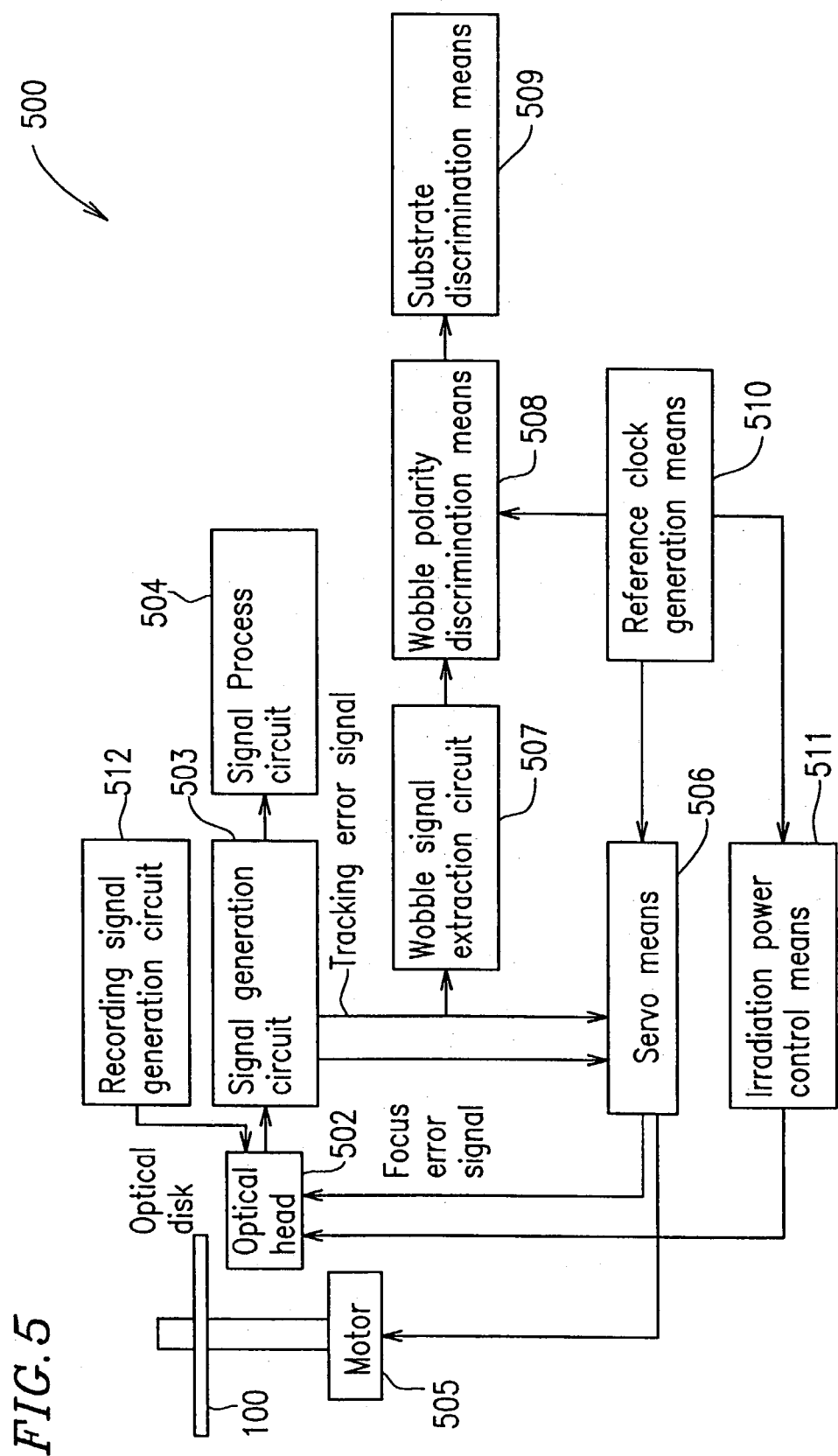
FIG. 5 is a block diagram of a recording/reproducing apparatus according to Embodiment 1.

Next, a method for detecting a difference in the phase of the oscillation is described with reference to FIG. 5. FIG. 5 is a block diagram of a recording/reproducing apparatus 500 for recording/reproducing data on/from the optical disk 100 shown in FIG. 1.

In FIG. 5, the recording/reproducing apparatus 500 includes: an optical head 502 for irradiating the optical disk 100 shown in FIG. 1 with light; a signal generation circuit 503 for generating a tracking error signal and a focus error signal; a signal process circuit 504 for processing a reproduced signal; a recording signal generation circuit 512 for generating a recording signal; a motor 505 for rotating the optical disk 100; a servo means 506 for controlling the optical head 502 and the motor 505; a wobble signal extraction circuit 507 for extracting a wobble signal which appears in the tracking error signal; a wobble polarity discrimination means 508 for discriminating the polarity of a wobble extracted by the wobble signal extraction circuit 507; a substrate discrimination means 509 for discriminating whether the servo means is performing an operation on either the first or second substrate according to a result provided by the wobble polarity discrimination means 508; a reference clock generation means 510 for providing clock to the servo means 506 and the wobble polarity discrimination means 508; and an irradiation power control means 511 for controlling irradiation power.

Figure 25:
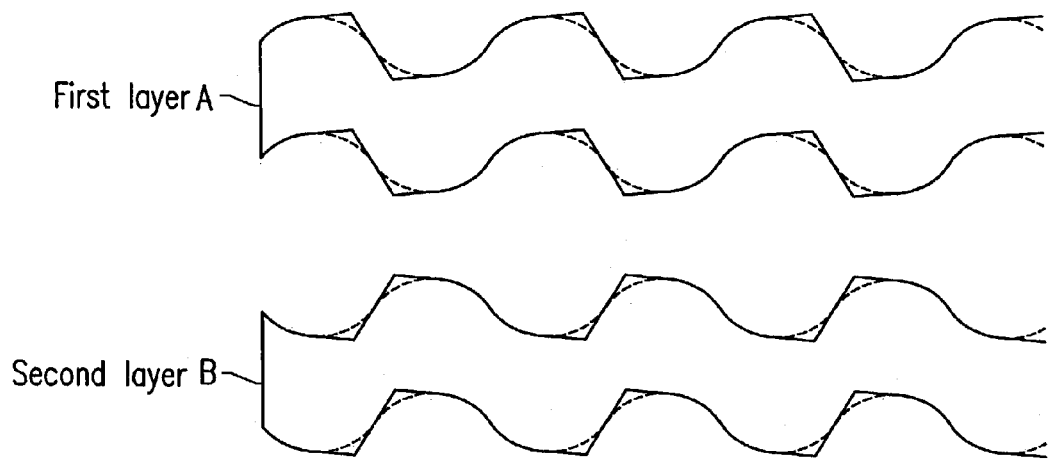

The operation of the recording/reproducing apparatus 500 is described below with reference to FIG. 5. The optical disk 100 is rotated by the motor 505, and the servo means 506 controls the optical head 502 so as to focus a laser beam on the optical disk 100 for scanning the tracks spirally formed on the optical disk 100. In this case, the irradiation power is set by the irradiation power control means 511 so as to be equivalent to a lower one of the irradiation power for reproducing data from the first recording layer 102 (FIG. 1) and the irradiation power for reproducing data from the second recording layer 104 (FIG. 1). It should be noted that the optical characteristics of the optical disk 100 are as shown in FIG. 25 and in Embodiment 1, the irradiation power for reproducing data from the first recording layer 102 is lower than that for reproducing data from the second recording layer 104.

The signal generation circuit 503 receives from the optical head 502 an electric signal corresponding to light reflected from the optical disk 100, thereby generating a focus error signal representing a light focus state of a laser beam on the optical disk 100, a tracking error signal representing a scanning state of tracks of the optical disk 100 and a reproduced signal of data recorded on the optical disk 100. The reproduced signal is demodulated by the signal process circuit 504 so as to reproduce data. Further, both the focus error signal and the tracking error signal are input to the servo means 506, and the servo means 506 controls the optical head 502 so as to realize the optimal light focus state and track scanning state.

The tracking error signal is also input to the wobble signal extraction circuit 507, and the wobble signal extraction circuit 507 extracts a wobble signal from the tracking error signal on which a signal recorded in an address region is also superimposed by means of a band-pass filter, which passes wobble components there through, and a binarizing circuit.

The wobble polarity discrimination means 508 uses the reference clock at a fixed frequency generated by the reference clock generation means 510 so as to discriminate the wobble polarities at the start positions 401 and 402 (FIG. 4) in the data regions 204 and 304 (FIG. 4) based on the wobble signal extracted by the wobble signal extraction circuit 507. The reference clock generation means 510 includes, for example, a quartz oscillator. Discrimination of the wobble polarities of, for example, a binarized wobble signal, can be realized using the reference clock so as to count the time period required for the binarized signal to rise from a prescribed position in the address region 204 or 304. The substrate discrimination means 509 observes a signal output by the wobble polarity discrimination means 508 so as to discriminate whether the servo means is performing an operation on the first or second substrate 101 or 105.

The recording signal generation circuit 512 generates a recording signal for recording data on the optical disk 100. The optical head 502 records a recording signal generated by the recording signal generation circuit 512 on either data region 204 or 304 of the optical disk 100.

Figure 6:
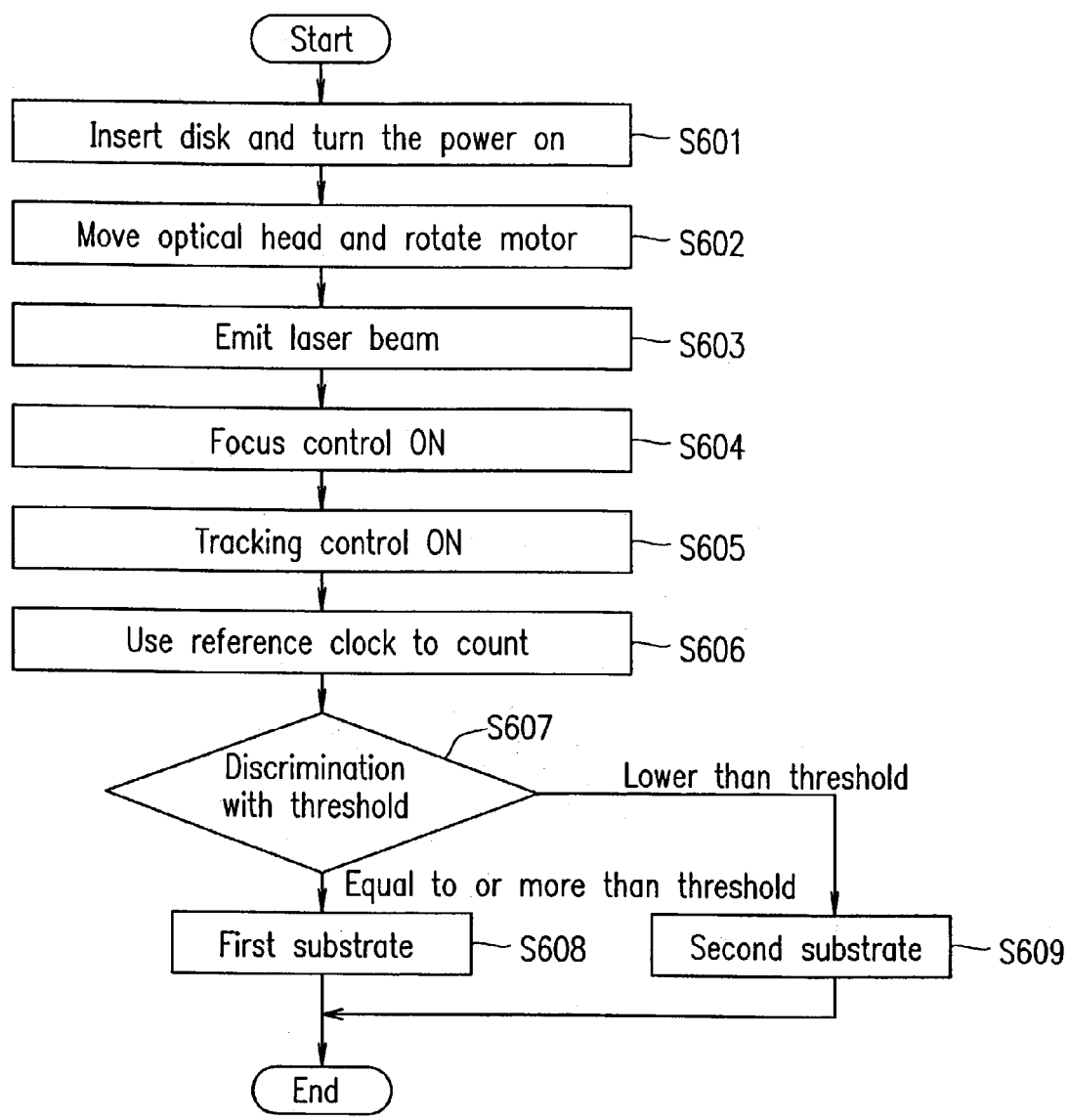
FIG. 6 is a flowchart for discriminating substrates according to Embodiment 1.

A flow of the substrate discriminating operation is further described with reference to a flowchart of FIG. 6. Firstly, once the power of the recording/reproducing apparatus 500 is turned on when the optical disk 100 is being inserted therein to or in a state where the optical disk 100 has been inserted therein to (S601), the optical head 502 is moved to the vicinity of an innermost circumference of the recording region 108 or 110, and the motor 505 is rotated at a prescribed rotation speed so as to rotate the optical disk 100 (S602). Next, the optical head 502 is made to emit a laser beam (S603), focus control is turned on so as to focus the laser beam on the first or second substrates 101 or 105 (S604). Further, tracking control is turned on so as to scan a groove track or a land track on the first or second substrate 101 or 105 with the laser beam (S605).

Figure 7:
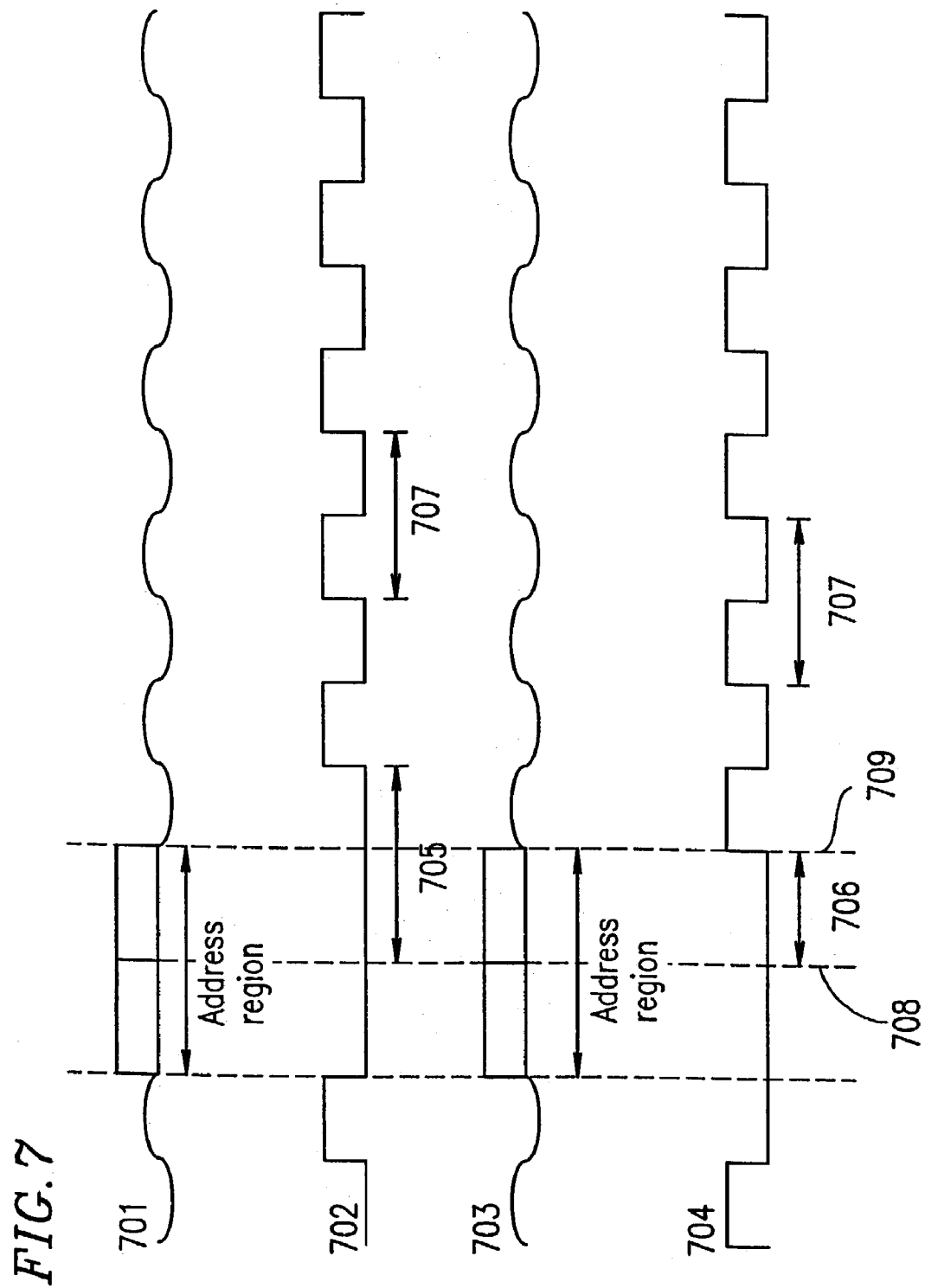
FIG. 7 is a diagram for explaining wobble signals according to Embodiment 1.

In this state, a signal including wobble components shown in FIG. 7 appears in a tracking error signal. In FIG. 7, reference numeral 701 denotes a tracking error signal when the servo means is performing an operation on the first substrate 101, and reference numeral 703 denotes a tracking error signal when the servo means is performing an operation on the second substrate 105. In the wobble signal extraction circuit 507, the band-pass filter performs bandwidth limiting on the tracking error signal so as to pass frequency bandwidth components of a wobble signal therethrough, thereby removing the other bandwidth components.

By binarizing the tracking error signal after the extraction of the wobble components, a wobble signal denoted by reference numeral 702 or 704 is obtained. Reference numeral 702 denotes a wobble signal when the servo means is performing an operation on the first substrate 101, and reference numeral 704 denotes a wobble signal when the servo means is performing an operation on the second substrate 105. The wobble polarity discrimination means 508 uses the reference clock so as to count time period 705 or 706 required for the binarized signal to rise from a prescribed position 708 in the address region (S606). In this case, when a wobble cycle 707 is equivalent to, for example, 120 counts of the reference clock, as shown in FIG. 7, the time period 705 in the wobble signal 702 is longer than the time period 706 in the wobble signal 704 by 60 counts. In the case where the number of counts between the prescribed position 708 of the address region and an end position 709 of the address region is, for example, 160, when a threshold is 190 counts, it is possible to determine that the first substrate is being operated on when the number of counts is equal to or more than 190 and the second substrate is being the operated on when the number of counts is lower than 190 (S607, S608 and S609).

It should be noted that in the case where the threshold of the count value is sufficiently large, even when the position on which a focusing or tracking operation of the servo means is performed is slightly deviated, it is possible to perform the discriminating operation. In this manner, by shifting phases of the wobbles at start positions in the data regions of the first and second substrates so as to differ from each other by 180 degrees, it is possible to increase a difference between the theoretical number of counts and a threshold, thereby increasing the reliability of discrimination.

In Embodiment 1, although a phase of the oscillation of the groove track is at zero degrees at the start position in the data region 204 of the first substrate 101 and a phase of the oscillation of the groove track is at 180 degrees at the start position of the data region 304 of the second substrate 105, the phases of the first and second substrates 101 and 105 are not limited to this. The phases of the first and second substrates 101 and 105 can be any phases other than those at zero degrees and 180 degrees so long as it is possible to discriminate whether the servo means is performing an operation on the first or second substrate 101 or 105.

As described above, by providing the first and second substrates so as to have different phases of the oscillation of the tracks at the start positions of the data regions, it is possible to discriminate between the first and second substrate 101 and 105 at the time a focus or tracking operation is performed by the servo means, i.e., before reading address information recorded in the address region, and therefore even when information representing which one of the first and second substrates 101 and 105 is the substrate is recorded in the lead-in regions 107 and 109 provided at the innermost circumference of the disk, it is not necessary to reproduce such information so as to discriminate between the first and second substrates 101 and 105. Therefore, it is possible to shorten the time period required for reproducing data from the lead-in regions 107 and 109.

In this manner, by providing the first and second substrates 101 and 105 so as to have different phases of the oscillation of the tracks at the start positions of the data regions, it is possible to discriminate between the first or second substrates 101 or 105 at the time a focus or tracking operation is performed by the servo means, i.e., before reading address information recorded in the address region, and therefore it is possible to shorten the time period required for reproducing data recorded in the address region of the substrate on which the servo means is performing an operation.

It should be noted that as in the case of Embodiment 1, by providing the address regions 203 and 303 in which the groove tracks 202 and 302 respectively become discontinuous at positions where an amplitude of the oscillation is minimum, even if the tracking position is deviated when reproducing address data recorded in the address regions 203 and 303 in which the groove tracks 202 and 302 respectively become discontinuous, it is possible to properly reproduce address data.

Figure 8:
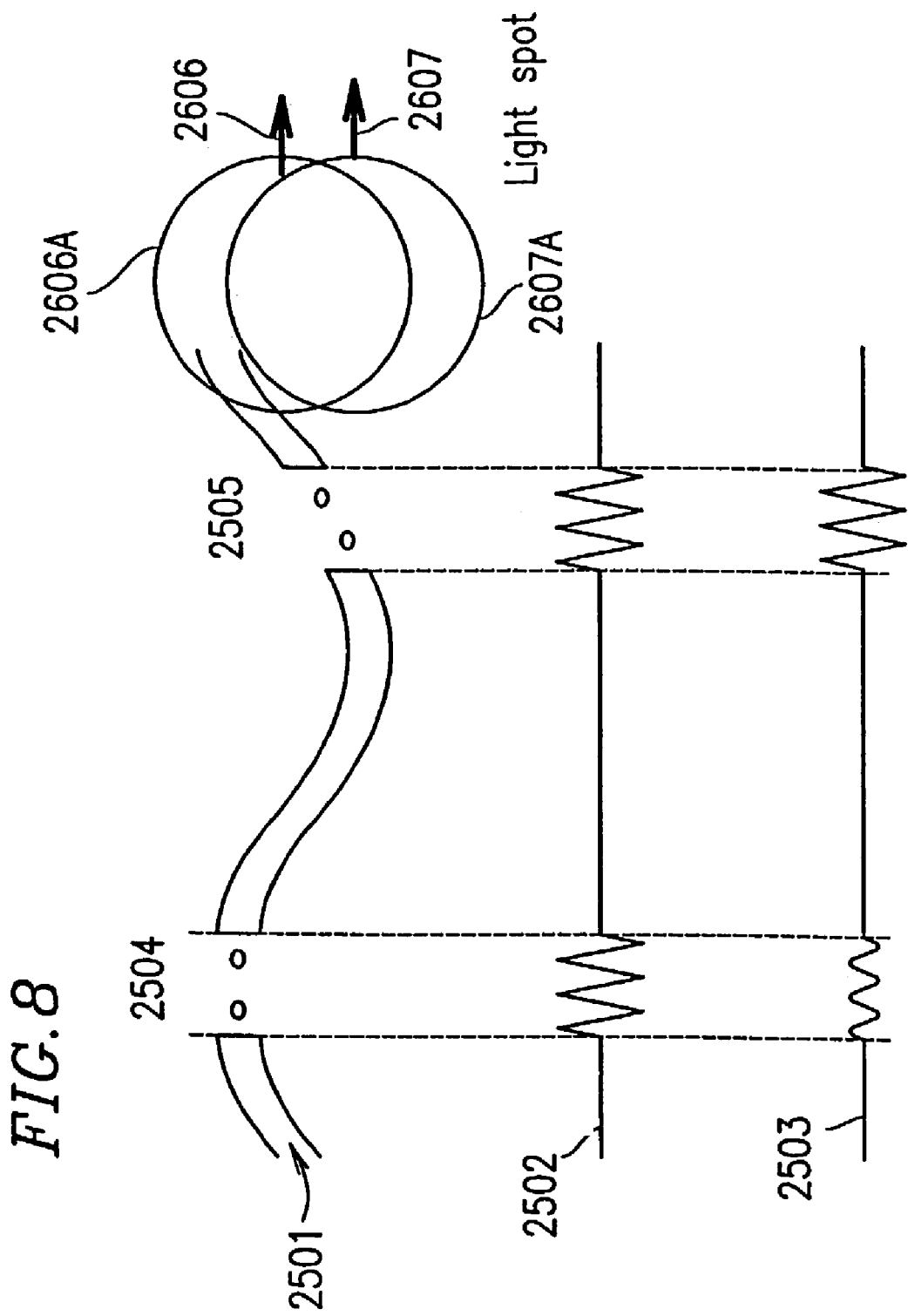
FIG. 8 is a diagram for explaining a method for reproducing data from an address region according to Embodiment 1.

Detailed description is provided with reference to FIG. 8. In FIG. 8, reference numeral 2501 denotes a groove track or a land track. Reference numerals 2606 and 2607 respectively denote trajectories in which light spots 2606A and 2607A pass. The light spot 2606A passes along substantially the center of the land track 2501 in the trajectory 2606 and the light spot 2607A passes along the land track 2501 at a lower side thereof on the sheet of the figure in the trajectory 2606. Reference numeral 2504 denotes an address region provided at a position where an amplitude of the oscillation of the land track 2501 becomes maximum and reference numeral 2505 denotes an address region provided at a position where the amplitude of the oscillation of the land track 2501 becomes minimum.

Here, reference numerals 2502 and 2503 respectively denote electric signals into which reflection light is converted when the trajectory 2606 of the light spot 2606A and the trajectory 2607 of the light spot 2607A pass along the tracks. As shown in FIG. 8, in the case where the address region 2505 is provided at a position where the amplitude of the oscillation becomes minimum, even if the tracking position of the light spot is deviated so that the light spot 2607A passes in the trajectory 2607, address information recorded in the address region 2505 can be correctly reproduced. However, in the case where the address region 2504 is provided at a position where the amplitude of the oscillation becomes maximum, if the tracking position of the light spot is deviated so that the light spot 2607A passes in the trajectory 2607, address information recorded in the address region 2504 cannot be correctly reproduced.

According to the present invention, it is not necessary to reproduce data recorded in the lead-in region or the address region so as to discriminate between the first and second substrates 101 and 105, and it is possible to set the irradiation power of a laser beam so as to be equal to or lower than the lowest irradiation power for reproducing data from the respective regions so long as the wobble polarities can be discriminated, thereby eliminating the risk of damaging data recorded in the data region or the address region.

In Embodiment 1, although an optical disk having two recording layers in which incident surfaces of readout light are identical to each other has been described, the recording layers are not limited to two layers. So long as at least two recording layers are available for recording, other layers may be used exclusively for reproducing.

Although pits are positioned in the address region according to Embodiment 1, the positions, the number and the arrangement of the pits may not be limited to this.

The oscillation of grooves formed in the other optical disk is described with reference to FIG. 10. Each of the groove tracks 202 and the land tracks 201 includes a sector portion 231. Each sector portion 231 includes a plurality of sectors 221A, 221B and 221C. The sectors 221A, 221B and 221C respectively include address regions 203A, 203B and 203C, and data regions 204A, 204B and 204C. Each of the groove tracks 302 and the land tracks 301 include an address block 251. Each address block 251 includes a plurality of sectors 241A, 241B and 241C. The sectors 241A, 241B and 241C respectively include address region 303A, 303B and 303C, and data region 304A, 304B and 304C.

In the address region 203A included in the sector 221A, a pattern, which corresponds to a code "S" representing a synchronization mark, is formed as part of the address information. By reading the pattern corresponding to the code "S", a position where an address block is started (a start sector position) is identified.

In the address region 203B included in the sector 221B, a pattern corresponding to a code "1" is formed as part of address information. In the address region 203C included in the sector 221C, a pattern corresponding to a code "0" is formed as part of the address information.

Figure 10:
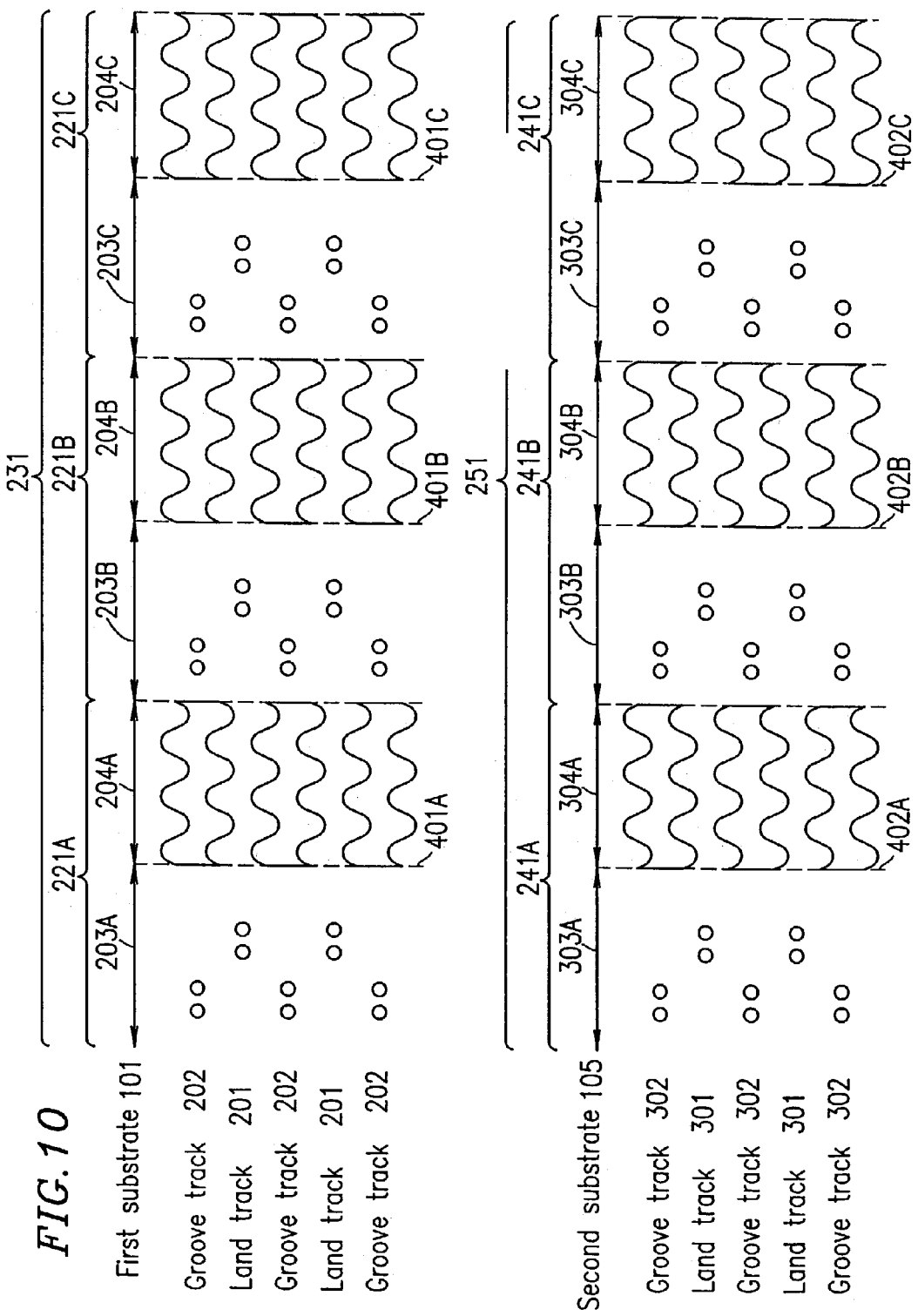
FIG. 10 is a diagram for explaining the oscillation of grooves formed in another optical disk according to Embodiment 1.

In the case of FIG. 10, three sectors 221A, 221B and 221C form a single address block, and from the sector 221A, the codes "S", "1" and "0" are sequentially recorded. Therefore, address information which represents a position of the sector portion 231 results in "S10" in which these codes are put together. Here, the identification code "S" represents a start position of address information, two codes "1" and "0" following the code "S" are binary information and this is substantial address information representing the position of the sector portion 231. For example, in the case of "S10" described above, this is represented as "2" in the decimal notation, so that it is possible to identify the address representing the position of the sector portion 231 as being 2.

As shown in FIG. 10, in the first substrate 101, a phase of the oscillation of each of the groove tracks 202 at the respective start positions 401A, 4011 and 401C of the data regions 204A, 204B and 204C is at zero degrees.

On the other hand, in the second substrate 105, a phase of the oscillation of each of the groove tracks 302 at the respective start positions 402A, 402B and 402C of the data regions 304A, 304B and 304C is at 180 degrees. That is, there is a difference between the first and second substrates 101 and 105 with respect to the phases of the oscillation of the tracks at the start positions of the data regions. By detecting the difference in the phase of the oscillation, it is possible to securely discriminate whether the servo means is performing an operation for controlling a light beam on the first or second substrate 101 or 105 in a short period of time.

Figure 11:
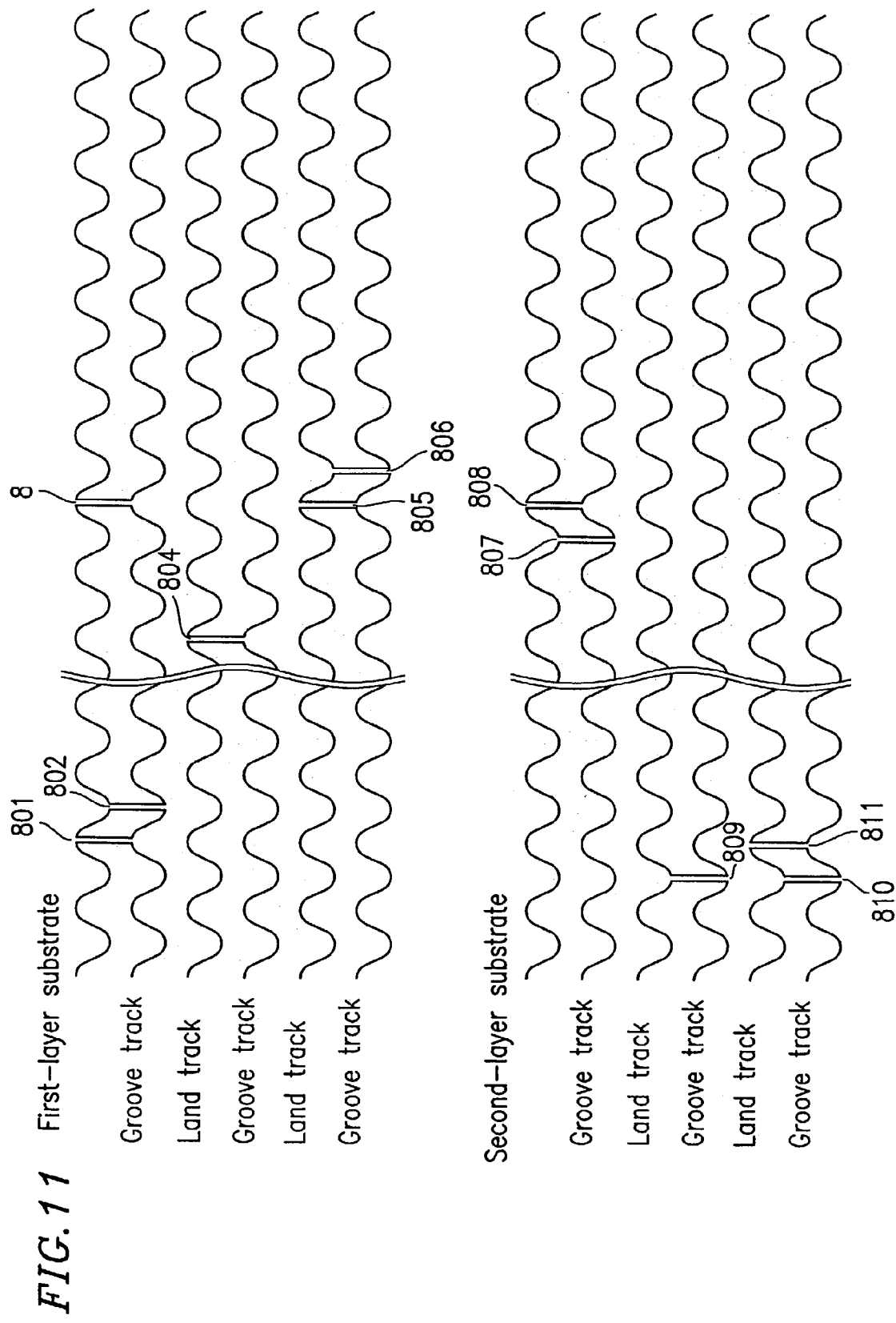
FIG. 11 is a diagram for explaining the oscillation of grooves formed in still another optical disk according to Embodiment 1.

Further, in Embodiment 1, although tracks are discontinuously provided due to the address regions, the address regions 203 and 303 shown in FIG. 4 are not always required so long as the start positions of the tracks are identified, and the tracks can be discontinuously provided due to regions except for the address regions. FIG. 11 shows an example in which pits are not present at positions where the tracks become discontinuous. It should be noted that in FIG. 11, recording operations are performed only on the groove tracks.

In FIG. 11, reference numerals 801, 803, 804 and 805 denote discontinuous portions each representing an end of a sector in the first substrate. A plurality of sectors each containing information which represents whether or not there is another discontinuous portion half a cycle after one discontinuous portion are put together as address information. For example, the discontinuous portion 802 follows the discontinuous portion 801 but no discontinuous portion follows the discontinuous portion 803. Reference numerals 807, 809 and 810 denote discontinuous portions each representing an end of a sector in the second substrate. A plurality of sectors each containing information which represents whether or not there is another discontinuous portion half a cycle after one discontinuous portion are put together as address information. For example, the discontinuous portion 808 follows the discontinuous portion 807 but no discontinuous portion follows the discontinuous portion 809.

As shown in FIG. 11, a phase of the oscillation of each track at the discontinuous portions 801, 803, 804 and 805 each representing an end of a sector in the first substrate is at 90 degrees, and a phase of the oscillation of each track at the discontinuous portions 807, 809 and 810 each representing an end of a sector in the second substrate is at 270 degrees. That is, there is a difference between the first and second substrates with respect to the phase of the oscillation of the tracks at the discontinuous portions each representing an end of a sector. By detecting the difference in the phase of the oscillation, it is possible to securely discriminate whether the servo means is performing an operation for controlling a light beam on the first or second substrates.

It should be noted that by providing regions in which the grooves become discontinuous at positions where an amplitude of the oscillation is maximum, it is possible to increase the displacement of a tracking error signal, and therefore it is possible to correctly detect whether or not any discontinuous portion is present.

Figure 9:
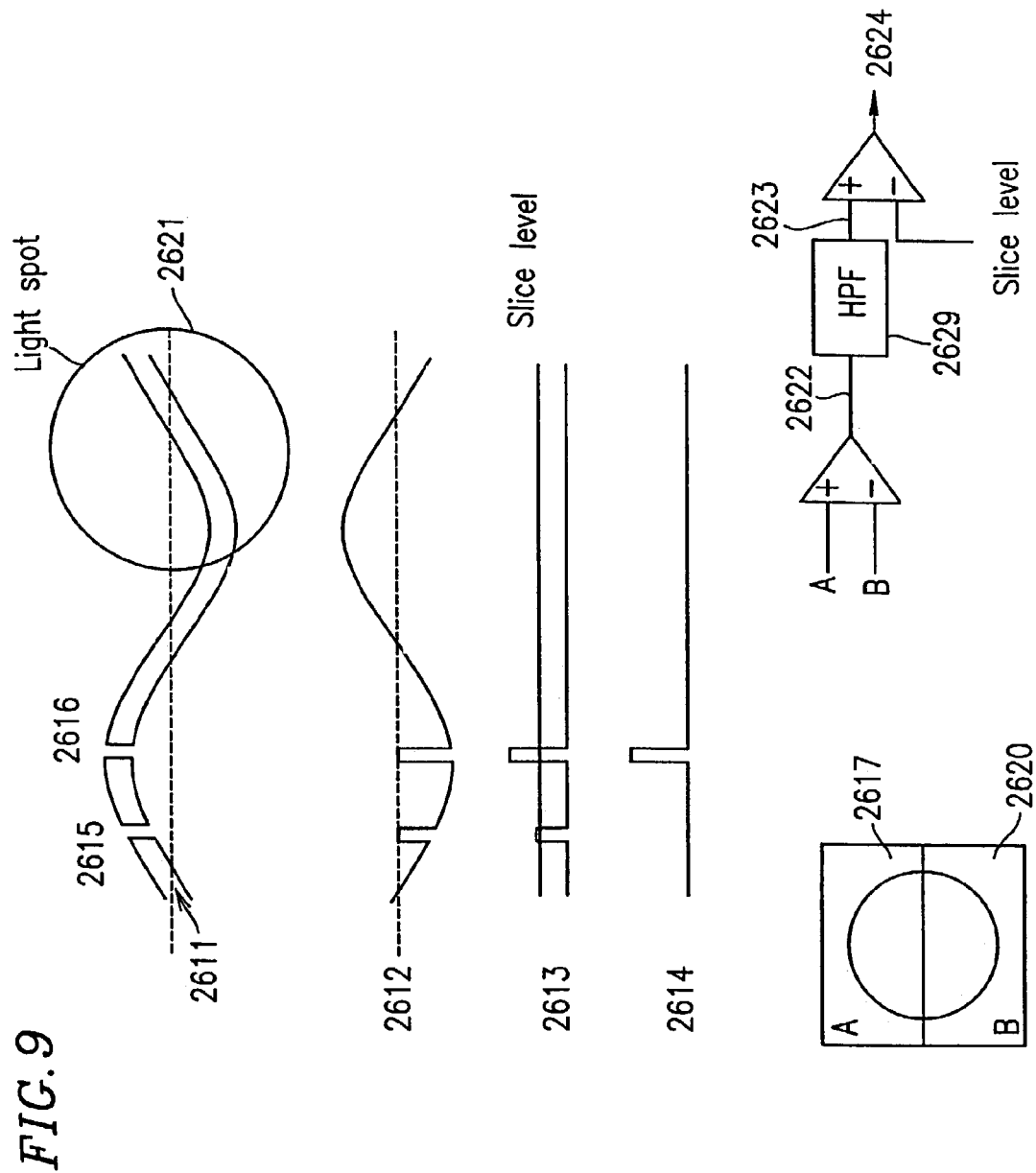
FIG. 9 is a diagram for explaining a method for detecting whether or not any discontinuous portion is present according to Embodiment 1.

Detailed description is provided with reference to FIG. 9. In FIG. 9, reference numeral 2611 denotes a groove track or a land track. A light spot 2621 substantially passes along the center of the track 2611. Reference numeral 2616 denotes an address region provided at a position where an amplitude of the oscillation of the track becomes maximum and reference numeral 2615 denotes an address region provided at a position except for the position where the amplitude of the oscillation of the track becomes maximum.

Reference numeral 2612 denotes a difference signal representing A–B in an element 2620 which converts reflection light into an electric signal when the light spot 2621 passes along the track 2611. It should be noted that reference numeral 2617 denotes a light spot focused on the element 2620. Reference numeral 2613 denotes an output signal when the difference signal 2612 is input to a high-pass filter 2629. A signal 2614 is a signal obtained by binarizing the signal 2613 at a prescribed slice level. The signal 2614 makes it possible to detect whether or not any discontinuous portion is present.

Here, in the case where the address region 2616 in which grooves are discontinuous is provided at a position where an amplitude of the oscillation is maximum, it is possible to increase the quantity of displacement of the difference signal 2612 can be increased as compared to the case where the address region 2615 is provided at a position except for the position where the amplitude of the oscillation is maximum, and therefore it is possible to correctly detect whether or not any discontinuous portion is-present.

Figure 12:
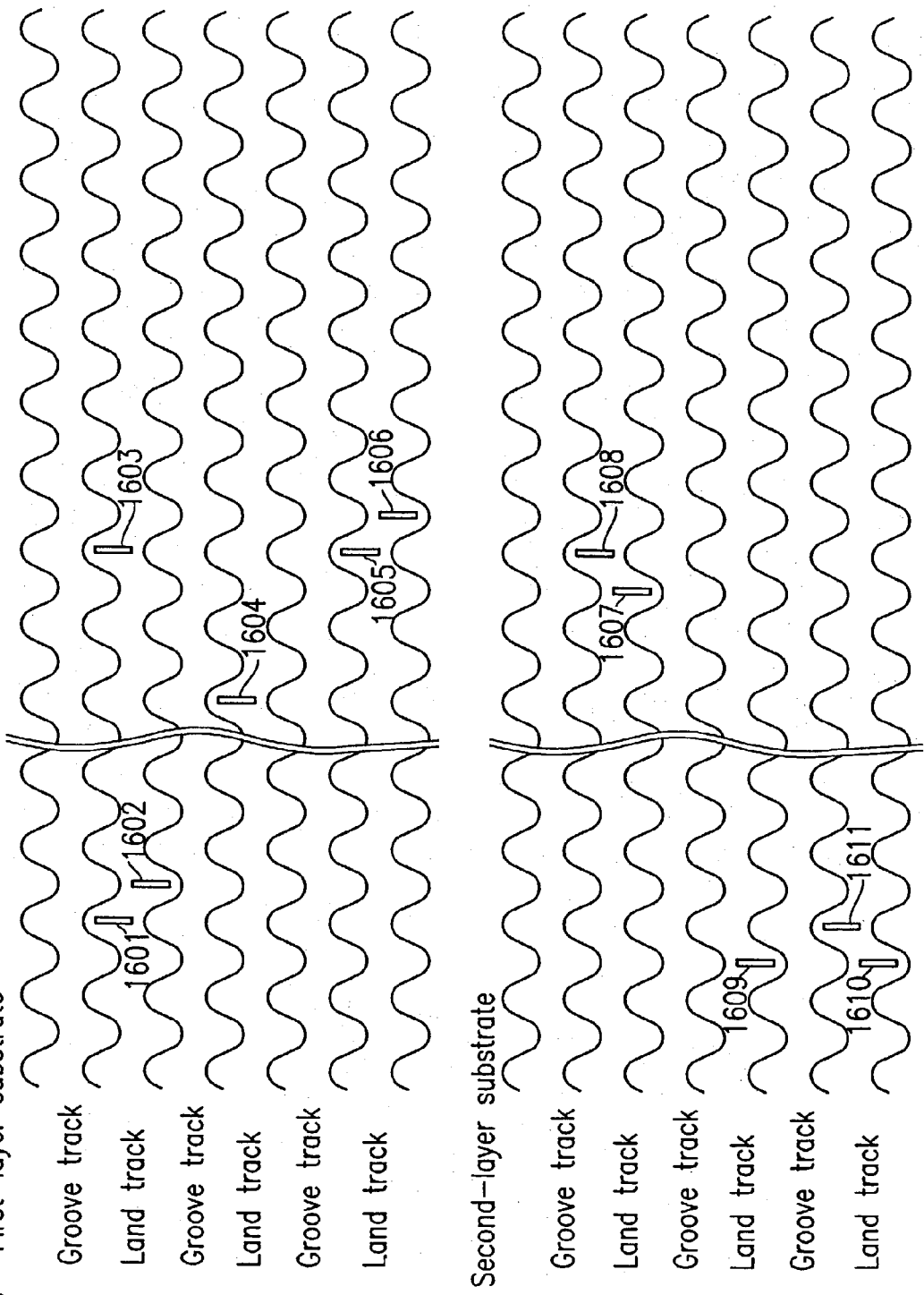
FIG. 12 is a diagram for explaining the oscillation of grooves formed in still another optical disk according to Embodiment 1.
Figure 13:
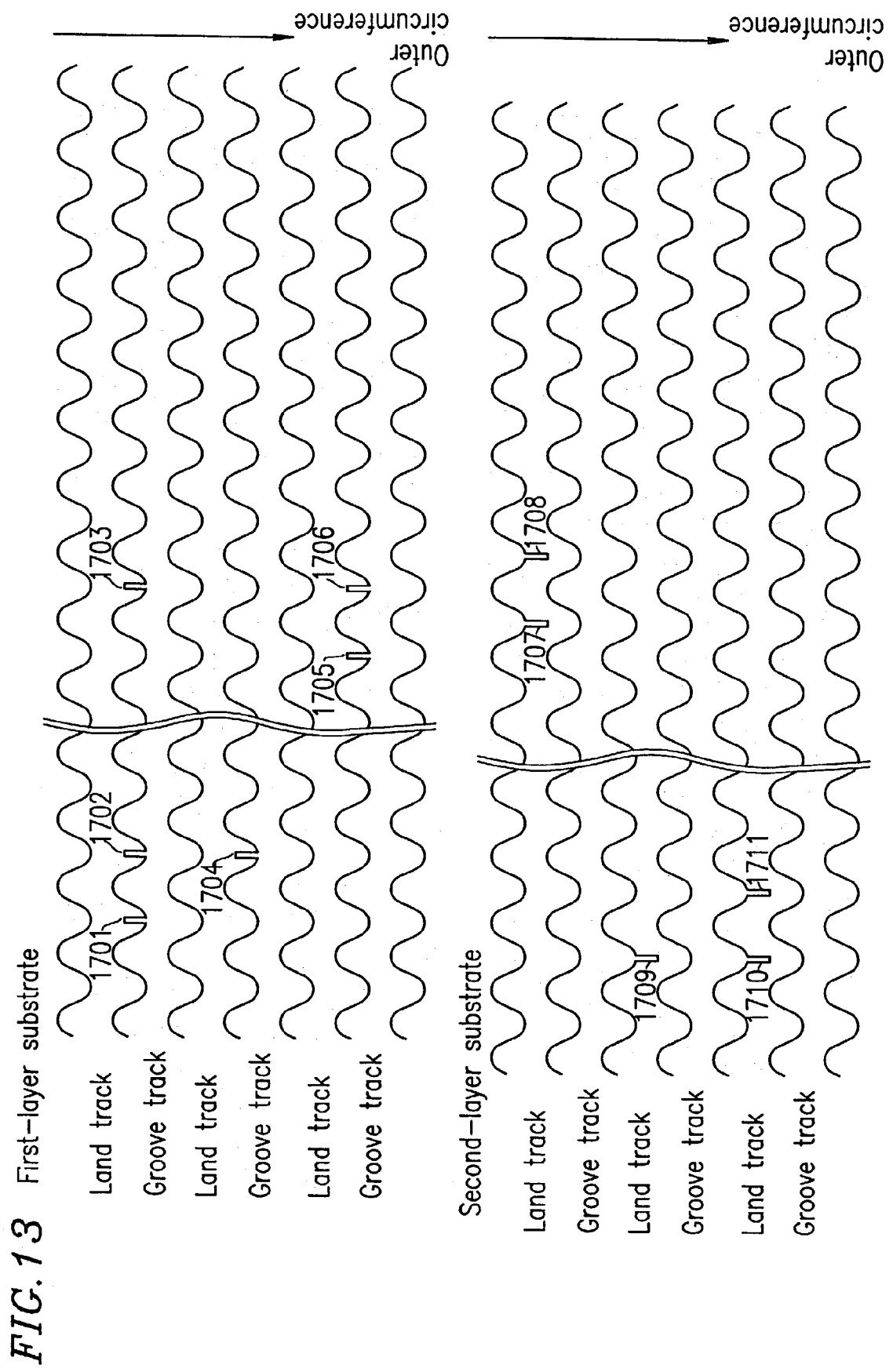
FIG. 13 is a diagram for explaining the oscillation of grooves formed in still another optical disk according to Embodiment 1.
Figure 14:
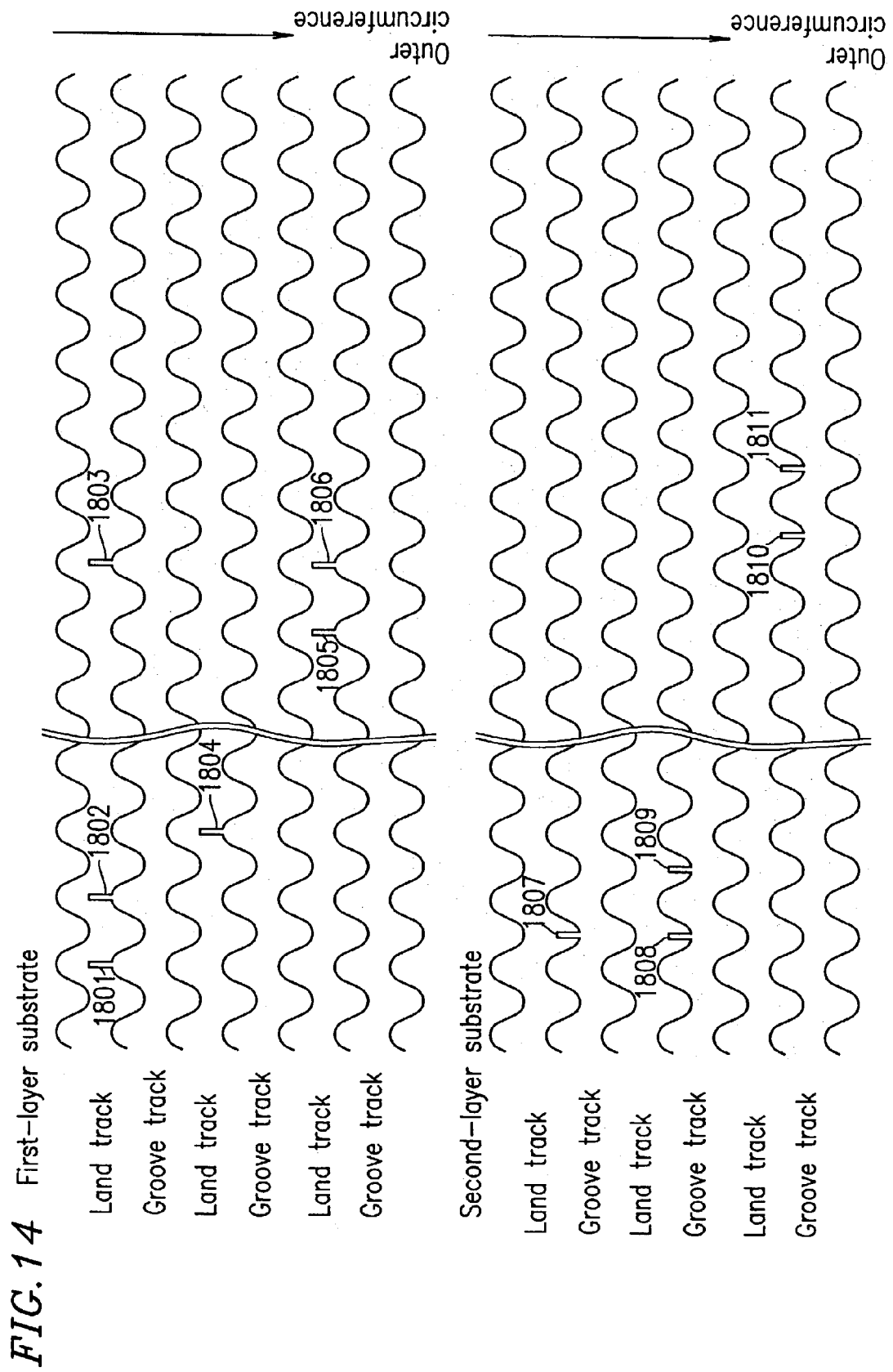
FIG. 14 is a diagram for explaining the oscillation of grooves formed in still another optical disk according to Embodiment 1.

Further, in Embodiment 1, although the tracks are discontinuously provided due to the address regions, the address regions 203 and 303 shown in FIG. 4 are not always required so long as the start positions of the tracks are identified, and therefore the address regions may not be present on the recording tracks. FIGS. 12, 13 and 14 show examples in which the address regions are not present on the recording tracks. It should be noted that in FIGS. 12, 13 and 14, recording operations are performed only on the groove tracks.

In FIG. 12, reference numerals 1601, 1603, 1604 and 1605 denote pits each representing an end of a sector in the first substrate. A plurality of sectors each containing information which represents whether or not there is another pit half a cycle after one pit are put together as address information of an adjacent groove track. For example, the pit 1602 follows the pit 1601 but no pit follows the pit 1603. Further, reference numerals 1607, 1609 and 1610 denote pits each representing an end of a sector in the second substrate. A plurality of sectors each containing information which represents whether or not there is another pit half a cycle after one pit are put together as address information of an adjacent groove track. For example, the pit 1608 follows the pit 1607 but no pit follows the pit 1609. It should be noted that an interval between pits is not limited to half a cycle and another cycle can be employed.

As shown in FIG. 12, a phase of the oscillation of each track at the pits 1601, 1603, 1604 and 1605 each representing an end of a sector in the first substrate is at 90 degrees, and a phase of the oscillation of each track at the pits 1607, 1609 and 1610 each representing an end of a sector in the second substrate is at 270 degrees. That is, there is a difference between the first and second substrates with respect to the phase of the oscillation of the tracks at the pits each representing an end of a sector. By detecting the difference in the phase of the oscillation, it is possible to securely discriminate whether the servo means is performing an operation for controlling a light beam on the first or second substrate.

Further, in FIG. 13, reference numerals 1701, 1703, 1704 and 1705 denote pits each representing an end of a sector in the first substrate. A plurality of sectors each containing information which represents whether or not there is another pit one cycle after one pit are put together as address information of an adjacent groove track. For example, the pit 1702 follows the pit 1701 but no pit follows the pit 1703. Furthermore, reference numerals 1707, 1709 and 1710 denote pits each representing an end of a sector in the second substrate. A plurality of sectors each containing information which represents whether or not there is another pit one cycle after one pit are put together as address information of an adjacent groove track. For example, the pit 1708 follows the pit 1707 but no pit follows the pit 1709. It should be noted that an interval between pits is not limited to one cycle and another cycle can be employed.

As shown in FIG. 13, the pits in the first substrate are located on the inner circumference side of the groove tracks and the pits in the second substrate are located on the outer circumference side of the groove tracks. That is, there is a difference between the first and second substrates with respect to a direction of sidewalls having pits. By detecting the difference, it is possible to discriminate whether the servo means is performing an operation for controlling a light beam on the first or second substrates. With respect to the directions of the pits, the pits in the first substrate can be located on the outer circumference of the groove tracks and the pits in the second substrate can be located on the inner circumference of the groove tracks.

Further, in FIG. 14, reference numerals 1801, 1803, 1804 and 1805 denote pits each representing an end of a sector in the first substrate. A plurality of sectors each containing information which represents whether or not there is another pit one cycle after one pit are put together as address information of a groove track. For example, the pit 1802 follows the pit 1801 but no pit follows the pit 1803. Further, reference numerals 1807, 1809 and 1810 denote pits each representing an end of a sector in the second substrate. A plurality of sectors each containing information which represents whether or not there is another pit one cycle after one pit are put together as address information of a groove track. For example, the pit 1809 follows the pit 1808 but no pit follows the pit 1807. It should be noted that an interval between pits is not limited to one cycle and another cycle can be employed.

As shown in FIG. 14, although the pits in both the first and second substrates are located on the inner circumference side of the groove tracks, a phase of the oscillation of each track at the pits 1801, 1803, 1804 and 1805 each representing an end of a sector in the first substrate is at 90 degrees and a phase of the oscillation of each track at the pits 1807, 1809 and 1810 each representing an end of a sector in the second substrate is at 270 degrees. That is, there is a difference between the first and second substrates with respect to the phase of the oscillation of the tracks at the pits each representing an end of a sector. By detecting the difference in the phase of the oscillation, it is possible to discriminate whether the servo means is performing an operation for controlling a light beam on the first or second substrate. It should be noted that the direction of the pits are not limited to this, and the pits can be located on the outer circumference side.

Figure 15:
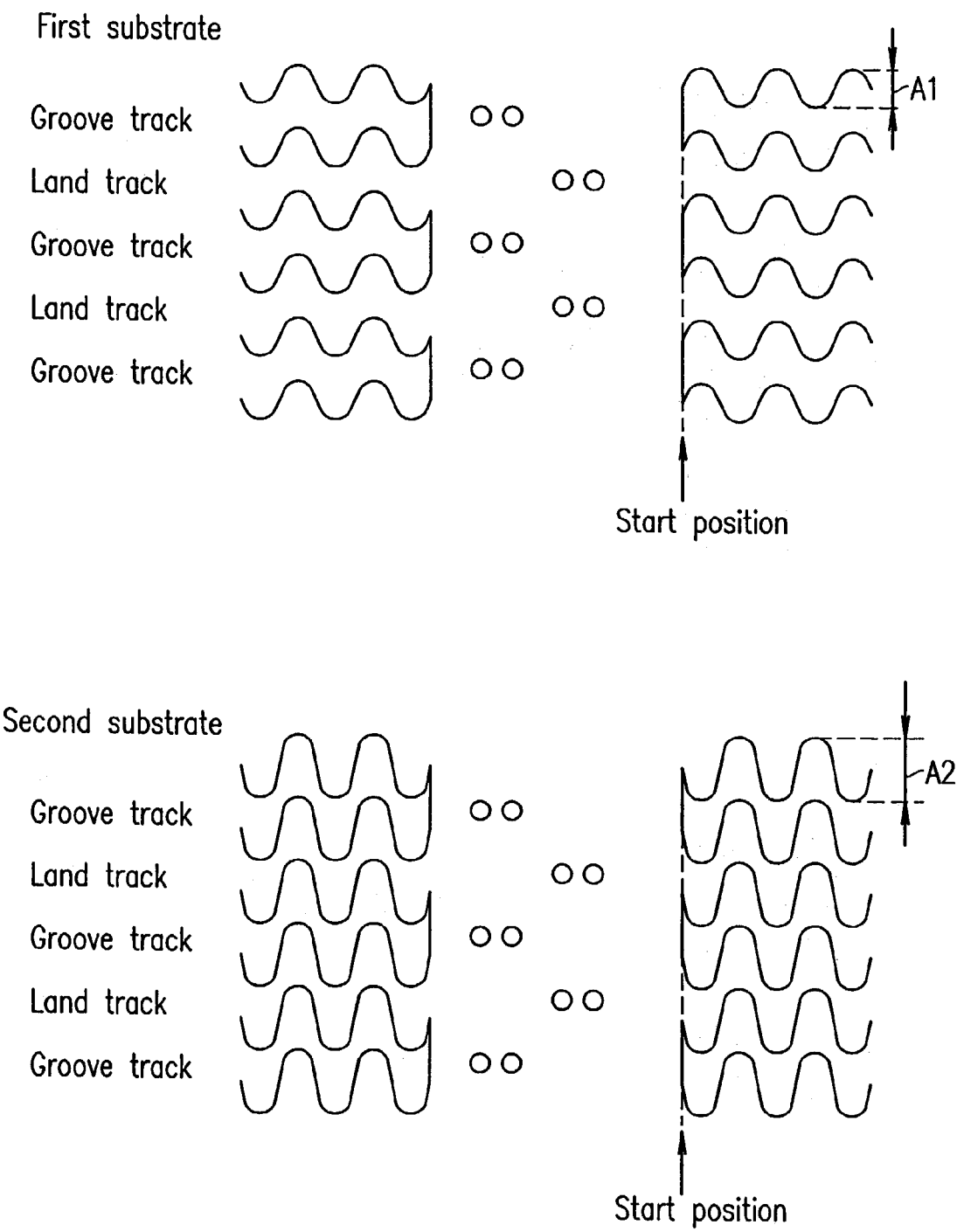
FIG. 15 is a diagram for explaining the oscillation of grooves formed in still another optical disk according to Embodiment 1.

In Embodiment 1, although the first and second substrates are not defined with respect to an oscillation amplitude of a wobble, the oscillation amplitude in the second substrate can be set so as to be higher than that in the first substrate. FIG. 15 shows an example of such a case. As shown in FIG. 15, by setting an oscillation amplitude A2 of the second substrate so as to be higher than an oscillation amplitude A1 of the first substrate, it is possible to improve a signal-to-noise ratio of a wobble signal in the case where the servo means is performing an operation for controlling a light beam on the second substrate.

(Embodiment 2)

Figure 16:
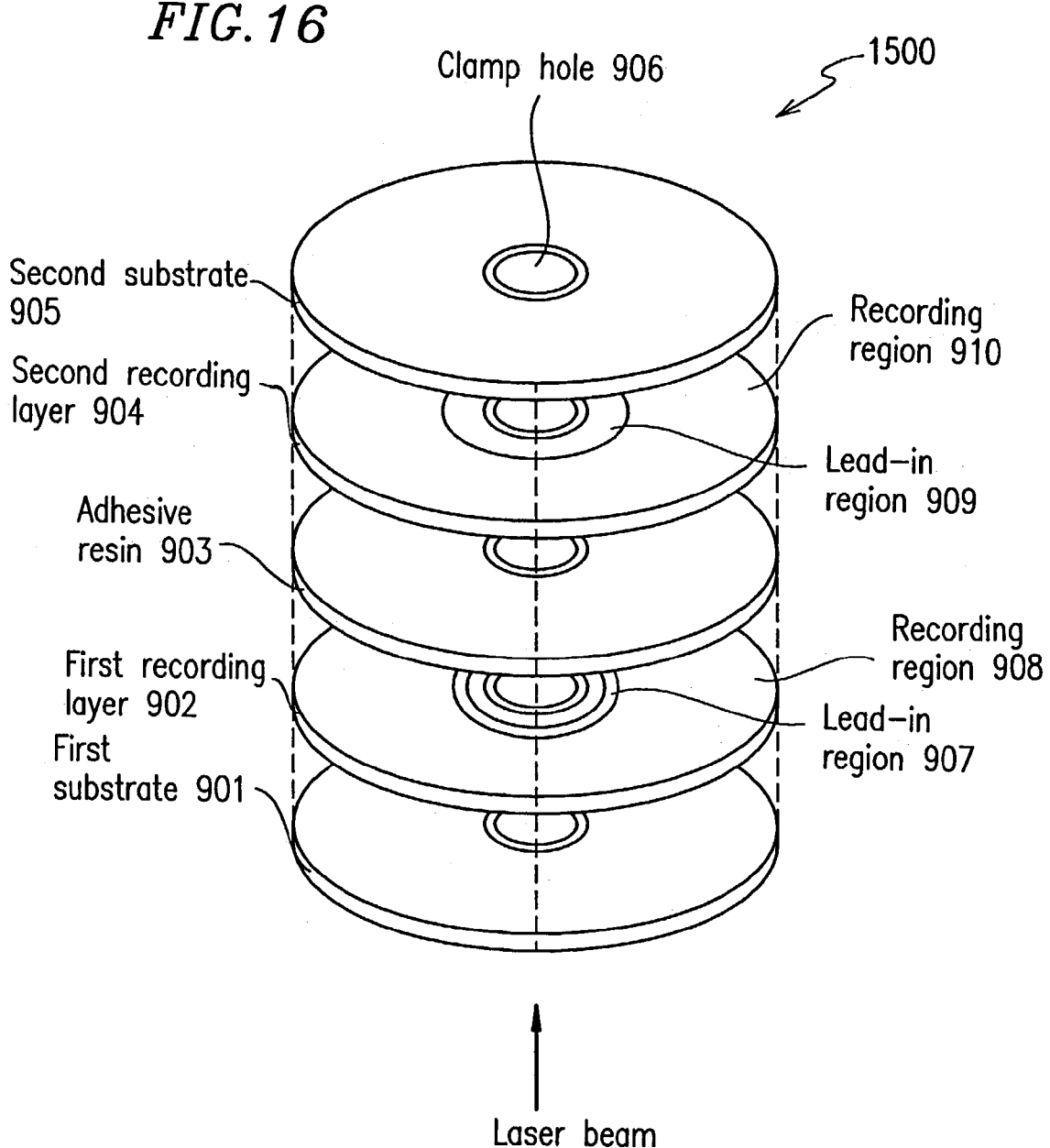
FIG. 16 is a structural diagram of an optical disk according to Embodiment 2 of the present invention.

FIG. 16 is a structural diagram of an optical disk 1500 according to Embodiment 2 of the present invention. In FIG. 16, the optical disk 1500 includes a first substrate 901, a first recording layer 902, an adhesive resin 903, a second recording layer 904 and a second substrate 905. The first substrate 901, the first recording layer 902, the adhesive resin 903, the second recording layer 904 and the second substrate 905 have their respective clamp holes 906. The first recording layer 902 includes a lead-in region 907 and a recording region 908. The second recording layer 904 includes a lead-in region 909 and a recording region 910. The first and second substrates 901 and 905 are formed of a polycarbonate resin or the like and respectively protect the first and second recording layers 902 and 904.

Figure 17:
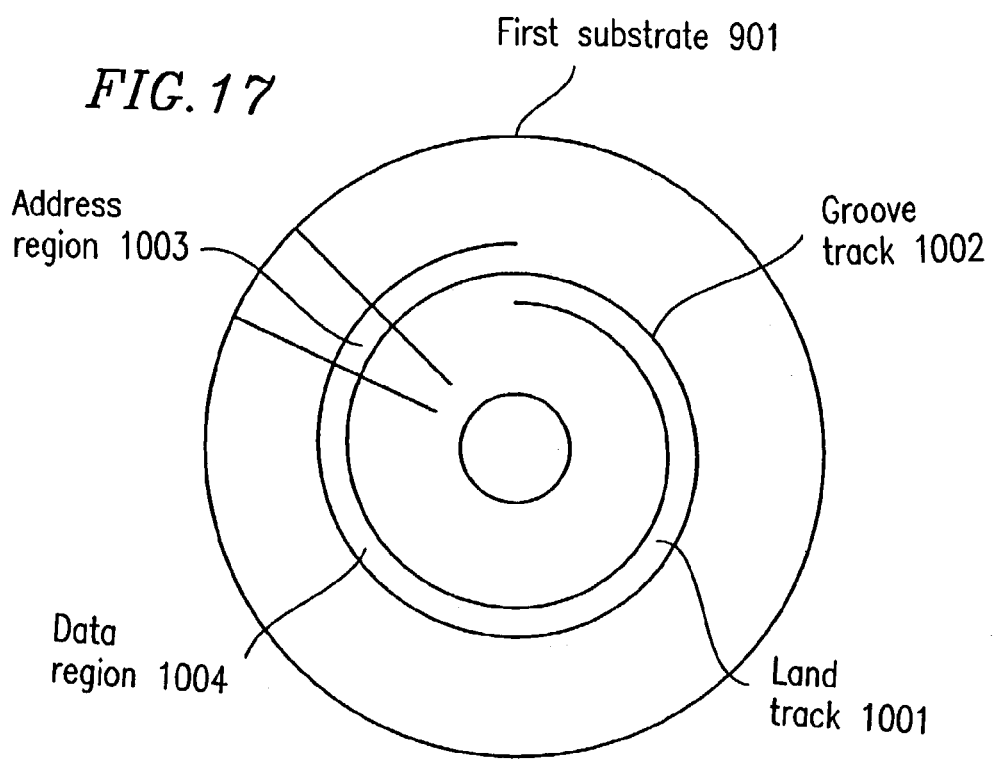
FIG. 17 is a plan view of a first substrate included in the optical disk according to Embodiment 2.

Next, FIG. 17 is referenced. FIG. 17 illustrates a sector structure on the first substrate 901 included in the optical disk 1500 shown in FIG. 16. The first substrate 901 is provided with groove tracks 1002 and land tracks 1001 each being formed between the groove tracks 1002. The groove tracks 1002 and the land tracks 1001 spirally extend and sinusoidally wobble. Information is recorded on both the groove tracks 1002 and the land tracks 1001, and each of the groove tracks 1002 and the land tracks 1001 includes one or more address regions 1003 and a data region 1004.

When each of the groove tracks 1002 and the land tracks 1001 is divided into a plurality of sectors, an address region 1003 and a data region 1004 are allocated to each sector. In this case, each address region 1003 is also referred to as a sector address region. With respect to a track structure, the land tracks 1001 and the groove tracks 1002 can be continuously and spirally connected to each other every other circuit.

Figure 18:
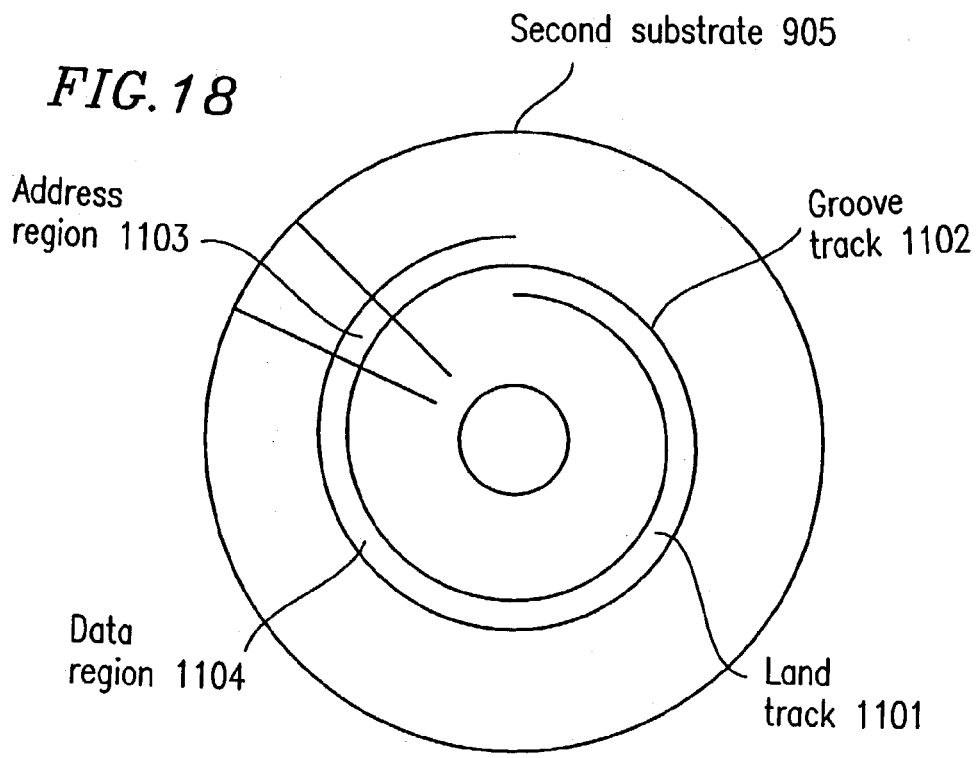
FIG. 18 is a plan view of a second substrate included in the optical disk according to Embodiment 2.

Next, FIG. 18 is referenced. FIG. 18 illustrates a sector structure on the second substrate 905 included in the optical disk 1500 shown in FIG. 16. The second substrate 905 is provided with groove tracks 1102 and land tracks 1101 which are formed between the groove tracks 1102. The groove tracks 1102 and the land tracks 1101 extend and wobble. Information is recorded on both the groove tracks 1102 and the land tracks 1101, and each of the groove tracks 1102 and the land tracks 1101 includes one or more address regions 1103 and a data region 1104.

When each of the groove tracks 1102 and the land tracks 1101 is divided into a plurality of sectors, an address region 1103 and a data region 1104 are allocated to each sector. In this case, each address region 1103 is also referred to as a sector address region. With respect to a track structure, the land tracks 1101 and the groove tracks 1102 can be continuously and spirally connected to each other every other circuit.

Figure 19:
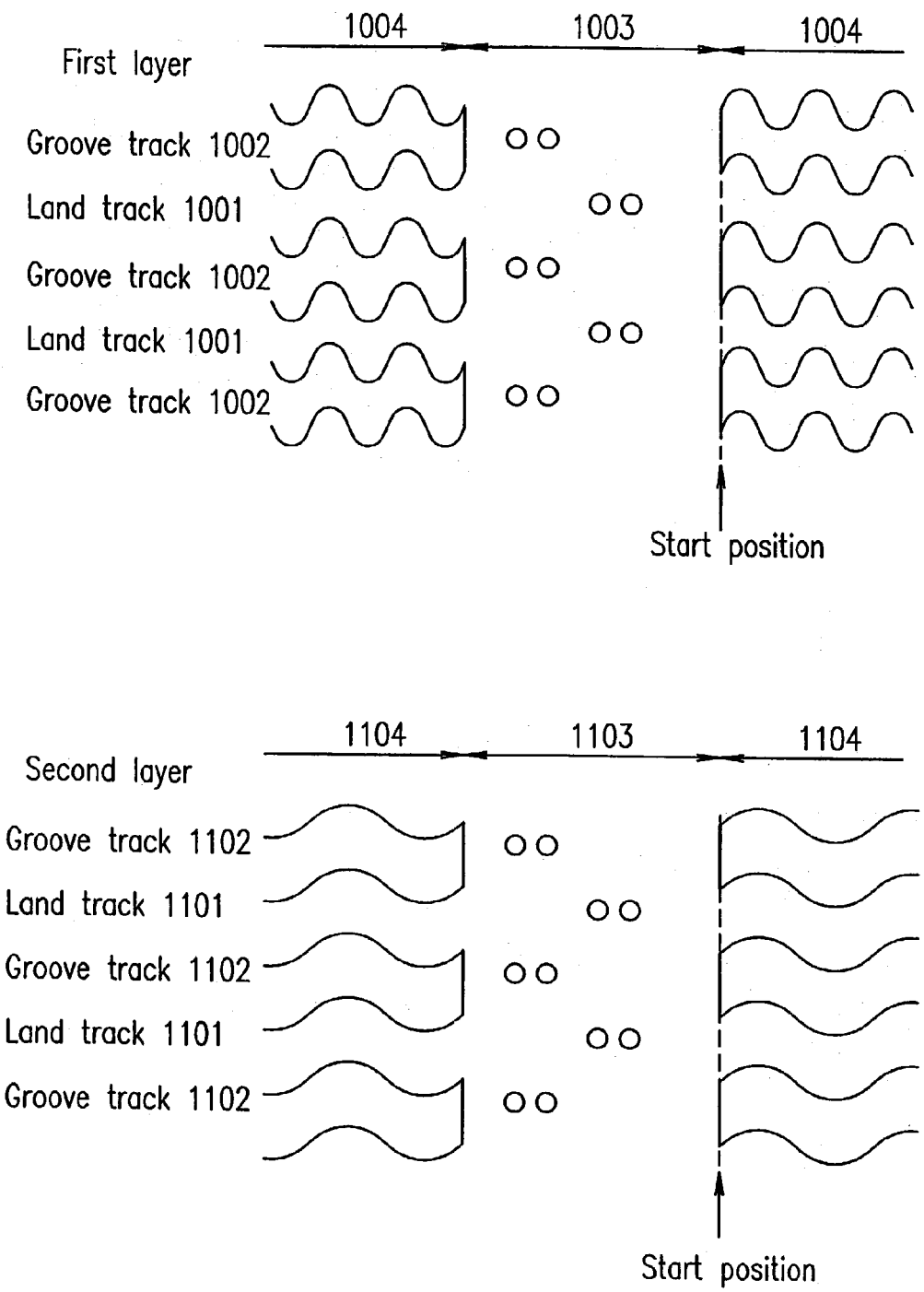
FIG. 19 is a diagram for explaining the oscillation of grooves formed in the optical disk according to Embodiment 2.

Next, FIG. 19 is referenced. FIG. 19 provides more detailed illustration of the vicinity of the address region 1003 of the first substrate 901 and the vicinity of the address region 1103 of the second substrate 905. The address regions 1003 each representing an address of a sector are allocated to the groove tracks 1002 and the land tracks 1001, and the address regions 1103 each representing an address of a sector are allocated to the groove tracks 1102 and the land tracks 1101. As shown in FIG. 19, a cycle of the oscillation of each groove track 1002 in the first substrate 901 is shorter than that of the oscillation of each groove track 1102 in the second substrate 905. That is, there is a difference between the first and second substrates 901 and 905 with respect to an oscillation frequency of a track. By detecting the difference in the oscillation frequency, whether the servo means is performing an operation for controlling a light beam on the first or second substrate is discriminated.

Figure 20:
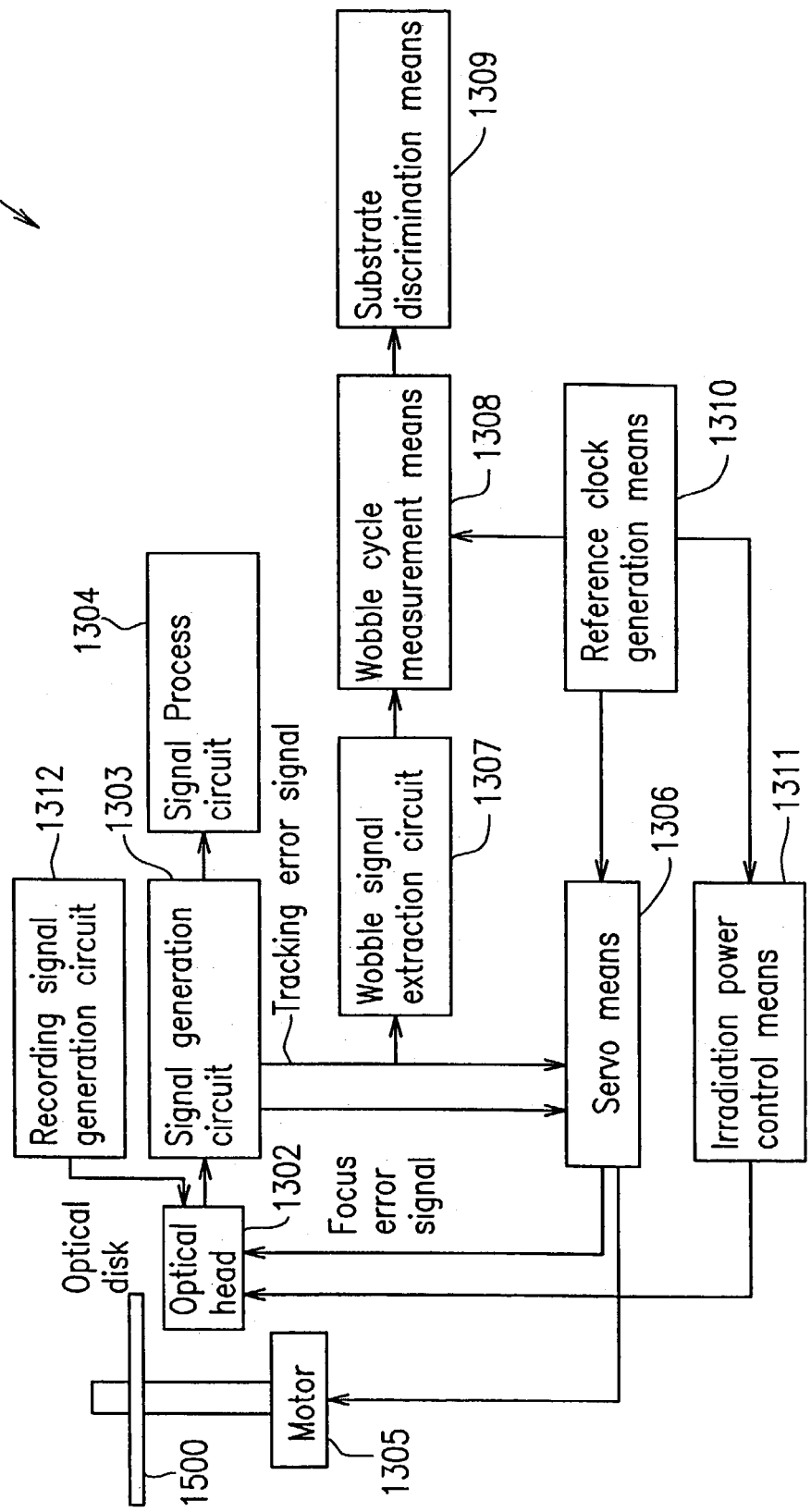
FIG. 20 is a block diagram of a recording/reproducing apparatus according to Embodiment 2.

Next, a method for detecting a difference in cycles of the oscillation is described with reference to FIG. 20. FIG. 20 is a block diagram of a recording/reproducing apparatus 1900 for recording/reproducing data on/from the optical disk 1500 shown in FIG. 16.

In FIG. 20, the recording/reproducing apparatus 1900 includes: an optical head 1302 for irradiating the optical disk 1500 shown in FIG. 16 with light; a signal generation circuit 1303 for generating a tracking error signal and a focus error signal; a signal process circuit 1304 for processing a reproduced signal; a recording signal generation circuit 1312 for generating a recording signal; a motor 1305 for rotating the optical disk 1500; a servo means 1306 for controlling the optical head 1302 and the motor 1305; a wobble signal extraction circuit 1307 for extracting a wobble signal which appears in the tracking error signal: a wobble cycle measurement means 1308 for measuring a cycle of a wobble extracted by the wobble signal extraction circuit 1307; a substrate discrimination means 1309 for discriminating whether the servo means is performing an operation on either the first or second substrate according to a result provided by the wobble cycle measurement means 1308; a reference clock generation means 1310 for providing clock to the servo means 1306 and the wobble cycle measurement means 1308; and an irradiation power control means 1311 for controlling irradiation power.

The operation of the recording/reproducing apparatus 1900 is described below with reference to FIG. 20. The optical disk 1500 is rotated by the motor 1305, and the servo means 1306 controls the optical head 1302 so as to focus a laser beam on the optical disk 1500 for scanning the tracks spirally formed on the optical disk 1500. In this case, the irradiation power is set by the irradiation power control means 1311 so as to be equivalent to a lower one of the irradiation power for reproducing data from the first recording layer 902 (FIG. 16) and the irradiation power for reproducing data from the second recording layer 904 (FIG. 16). It should be noted that the optical characteristics of the optical disk 1500 are as shown in FIG. 25 and in Embodiment 2, the irradiation power for reproducing data from the first recording layer 902 is lower than that for reproducing data from the second recording layer 904.

The signal generation circuit 1303 receives from the optical head 1302 an electric signal corresponding to light reflected from the optical disk 1500, thereby generating a focus error signal representing a light focus state of a laser beam on the optical disk 1500, a tracking error signal representing a scanning state of tracks of the optical disk 1500 and a reproduced signal of data recorded on the optical disk 1500. The reproduced signal is demodulated by the signal process circuit 1304 so as to reproduce data. Further, both the focus error signal and the tracking error signal are input to the servo means 1306, and the servo means 1306 controls the optical head 1302 so as to realize the optimal light focus state and track scanning state.

The tracking error signal is also input to the wobble signal extraction circuit 1307, and the wobble signal extraction circuit 1307 extracts a wobble signal from the tracking error signal on which a signal recorded in an address region is also superimposed according to a structure of the address region by means of a band-pass filter, which passes wobble components therethrough, and a binarizing circuit.

The wobble cycle measurement means 1308 uses the reference clock at a fixed frequency generated by the reference clock generation means 1310 so as to measure a cycle of the wobble signal output by the wobble signal extraction circuit 1307. The reference clock generation means 1310 includes, for example, a quartz oscillator. Measurement of the wobble cycle can be realized, for example, using the reference clock so as to count the time period between one rise of the wobble signal and the next rise. The substrate discrimination means 1309 observes a signal output by the wobble cycle measurement means 1308 so as to discriminate whether the servo means is performing an operation on the first or second substrates.

The recording signal generation circuit 1312 generates a recording signal for recording data on the optical disk 1500. The optical head 1302 records a recording signal generated by the recording signal generation circuit 1312 on either data region 1004 or 1104 of the optical disk 1500.

Figure 21:
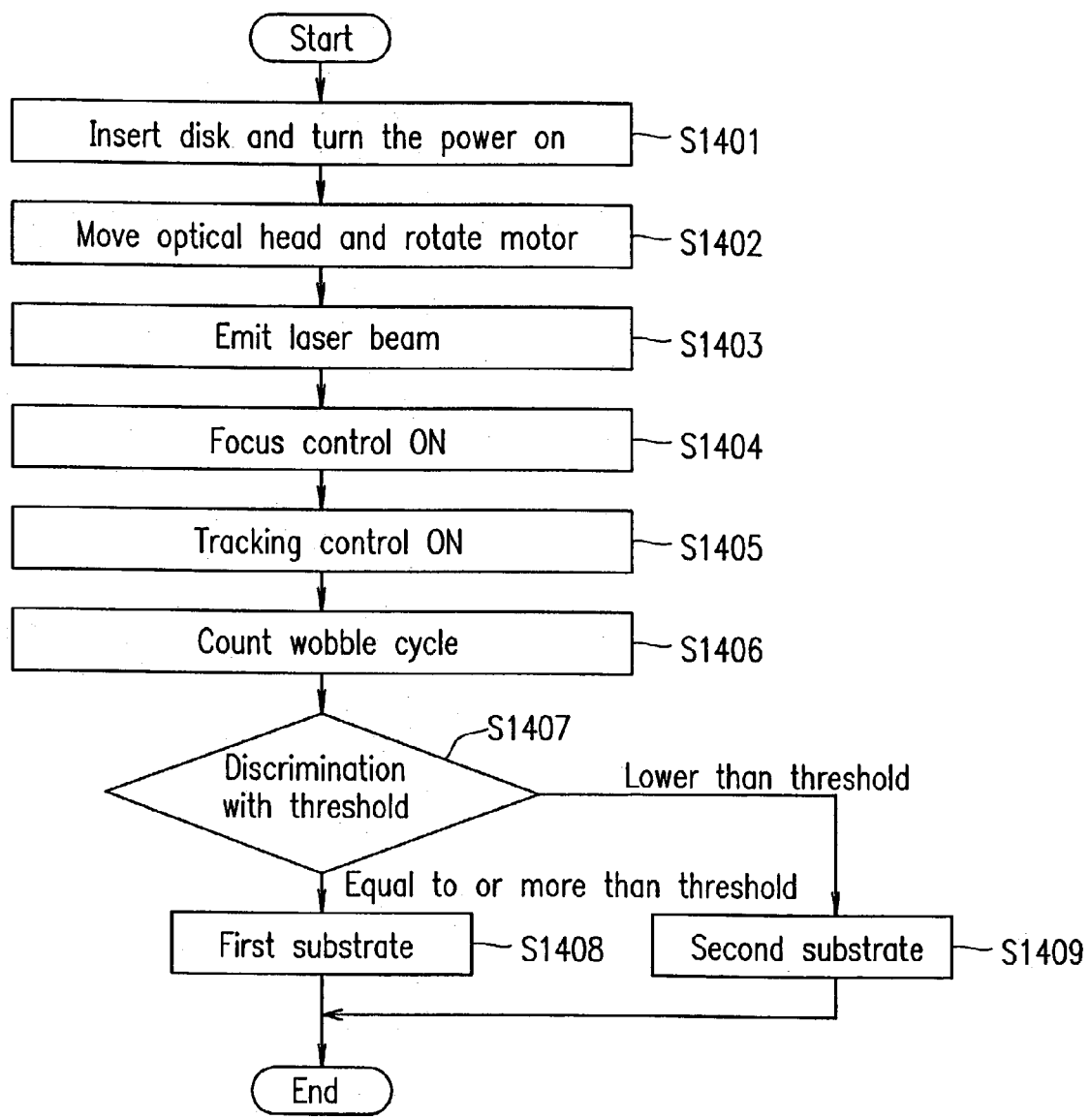
FIG. 21 is a flowchart for discriminating substrates according to Embodiment 2.

Next, a flow of the substrate discriminating operation is described with reference to a flowchart of FIG. 21. Firstly, once the power of the recording/reproducing apparatus is turned on when the optical disk 1500 is being inserted therein to or in a state where the optical disk 1500 has been inserted therein to (S1401), the optical head 1302 is moved to the vicinity of an innermost circumference of the data region, and the motor 1305 is rotated at a prescribed rotation speed so as to rotate the optical disk 1500 (S1402). Next, the optical head is made to emit a laser beam (S1403), focus control is turned on so as to focus the laser beam on the first or second substrate 901 or 905 (S1404). Further, tracking control is turned on so as to scan a groove track or a land track with the laser beam (S1405).

Figure 22:
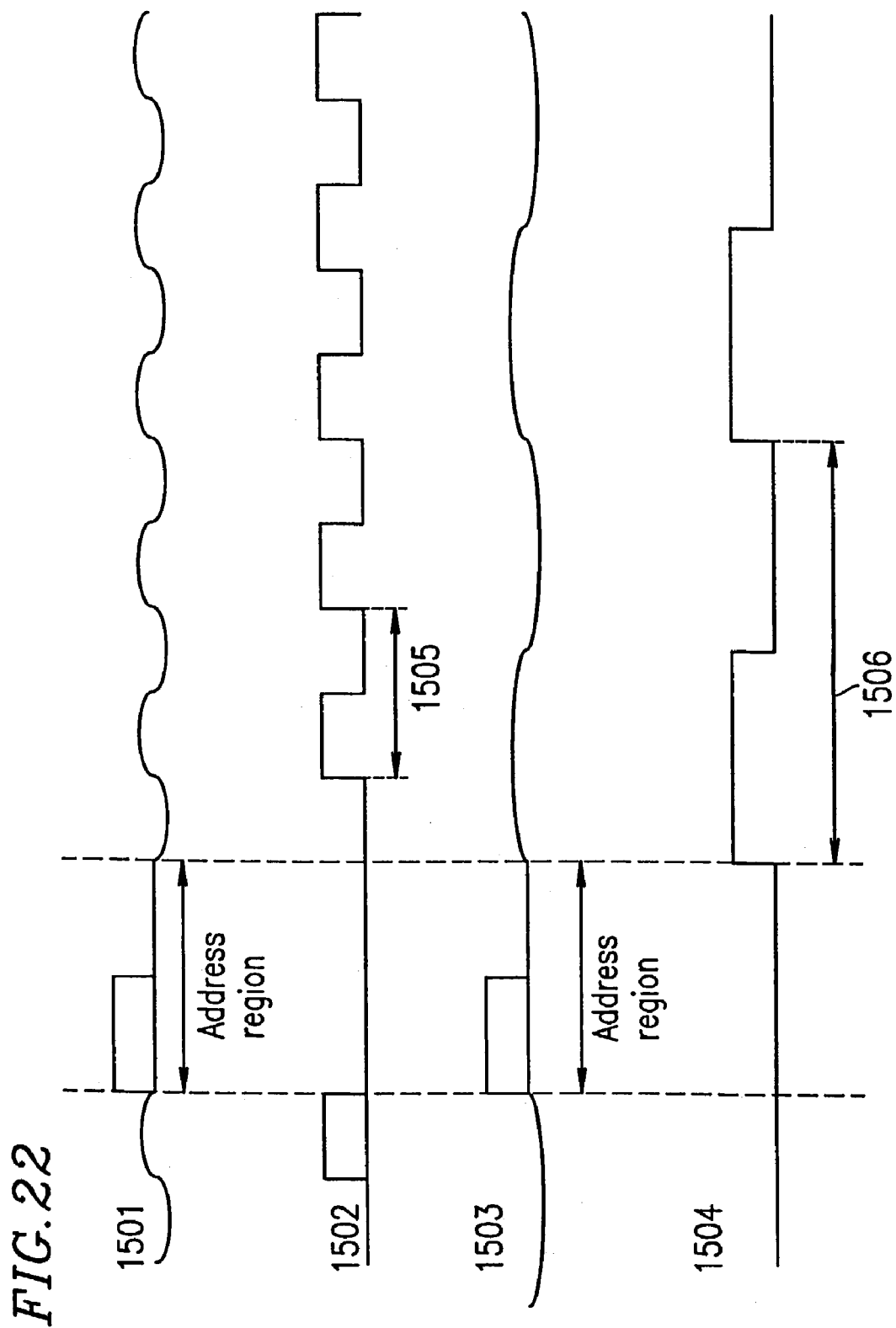
FIG. 22 is a diagram for explaining wobble signals according to Embodiment 2.

In this state, a signal including wobble components shown in FIG. 22 appears in a tracking error signal. In FIG. 22, reference numeral 1501 denotes a tracking error signal when the servo means is performing an operation on the first substrate 901, and reference numeral 1503 denotes a tracking error signal when the servo means is performing an operation on the second substrate 905. In the wobble signal extraction circuit 1307, the band-pass filter performs bandwidth limiting on the tracking error signal so as to pass frequency bandwidth components of a wobble signal therethrough, thereby removing the other bandwidth components.

By binarizing the tracking error signal after the extraction of the wobble components, a signal denoted by reference numeral 1502 or 1504 is obtained. Reference numeral 1502 denotes a signal when the servo means is performing an operation on the second substrate, and reference numeral 1504 denotes a signal when the servo means is performing an operation on the first substrate. The wobble cycle measurement means 1308 uses the reference clock so as to count wobble cycle 1505 or 1506 (S1406). In this case, when the number of counts in the second substrate 905 is 220 and the number of counts in the first substrate 901 is 160, the signal 1502 obtained from the second substrate is longer than the signal 1504 obtained from the first substrate by 60 counts. Therefore, when a threshold is 190 counts, it is possible to determine that the first substrate is being operated on when the number of counts is equal to or more than 190 and the second substrate is being operated on when the number of counts is lower than 190 (S1407, S1408 and S1409).

It should be noted that in the case where the threshold of the count value is sufficiently large, even when the position on which a focusing or tracking operation of the servo means is performed is slightly deviated, it is possible to perform the discriminating operation. In this manner, by setting the wobble cycles of the first and second substrates so as to differ from each other, it is possible to increase a difference between the theoretical number of counts and a threshold, thereby increasing the reliability of discrimination.

In Embodiment 2, although the number of counts in the second substrate 905 is 220 and the number of counts in the first substrate 901 is 160, the number of counts in both the first and second substrates is not limited to this and the other number of counts can be employed so long as it is possible to discriminate as to on which layer the servo means is performing an operation according to the difference in the number of counts.

Further, in Embodiment 2, although the number of counts in the second substrate 905 is 220, the number of counts in the first substrate 901 is 160 and the difference in the number of counts between them is 60, the difference in the number of counts is not limited to this and the difference in the number of counts can be changed to the other number so long as it is possible to discriminate as to on which layer the servo means is performing an operation according to the change in the difference in the number of counts.

Furthermore, when the amplitudes of the oscillation of the grooves are substantially equivalent, a higher amplitude of a reproduced signal is obtained at a lower frequency of the oscillation, and therefore as in the case of Embodiment 2, by setting a wobble frequency of a substrate located far from a surface which is irradiated with a laser beam so as to be lower than that of a substrate located near the surface, it is possible to reduce a deterioration in a signal-to-noise ratio of the signal 1501 obtained from the second substrate.

As described above, by providing the first and second substrates such that cycles of the oscillation of the tracks at start positions of their respective data regions are different from each other, it is possible to discriminate between the first and second substrates at the time a focus or tracking operation is performed by the servo means, and therefore even when information representing which one of the first and second substrates 901 and 905 is the substrate is recorded in the lead-in regions provided at the innermost circumference of the disk, it is not necessary to reproduce such information so as to discriminate between the first and second substrates 901 and 905. Therefore, it is possible to shorten the time period required for reproducing data from the lead-in regions.

In this manner, by providing the first and second substrates 901 and 905 such that cycles of the oscillation of the tracks at start positions of their respective data regions are different from each other, it is possible to discriminate between the first and second substrates 901 and 905 at the time a focus or tracking operation is performed by the servo means, and therefore it is possible to shorten the time period required for reproducing data recorded in the address region of the substrate on which the servo means is performing an operation.

It should be noted that according to the present invention, it is not necessary to reproduce data recorded in the lead-in region or the address region so as to discriminate between the first and second substrates 901 and 905, and it is possible to set the irradiation power of a laser beam so as to be equal to or lower than the lowest irradiation power for reproducing data from the respective regions so long as the wobble polarities can be discriminated, thereby eliminating the risk of damaging data recorded in the data region or the address region.

In Embodiment 2, although an optical disk having two recording layers in which incident surfaces of readout light are identical to each other has been described, the recording layers are not limited to two layers. So long as at least two recording layers are available for recording, other layers may be used exclusively for reproducing.

Although pits are positioned in the address region according to Embodiment 2, the positions, the number and the arrangement of the pits may not be limited to this.

Further, in Embodiment 2, although tracks are discontinuously provided due to the address regions, the address regions 1003 and 1103 shown in FIG. 18 are not always required so long as the start positions of the tracks are identified, and the tracks can be discontinuously provided due to regions except for the address regions.

Furthermore, in Embodiment 2, although the first and second substrates are not defined with respect to an oscillation amplitude of a wobble, the oscillation amplitude in the second substrate can be set so as to be higher than that in the first substrate. FIG. 23 shows an example of such a case. As shown in FIG. 23, by setting an oscillation amplitude A4 of the second substrate so as to be higher than an oscillation amplitude A3 of the first substrate, it is possible to improve a signal-to-noise ratio of a wobble signal in the case where the servo means is performing an operation for controlling a light beam on the second substrate.

According to Embodiments 1 and 2, in the optical disks shown in FIGS. 11, 12, 13 and 14, a recording operation is performed only on the groove tracks and in the optical tracks shown in FIGS. 4, 10, 15, 19 and 23 besides the above-mentioned figures, a recording operation is performed on both the land tracks and groove tracks. However, tracks on which the recording operation is performed are not limited to this. In the optical disks shown in FIGS. 11, 12, 13 and 14, a recording operation can be performed only on the land tracks, and in the optical tracks shown in FIGS. 4, 10, 15, 19 and 23 besides the above-mentioned figures, a configuration that a recording operation is performed on only one type of track, i.e., address information is provided to only one type of track, can be employed.

Figure 24:
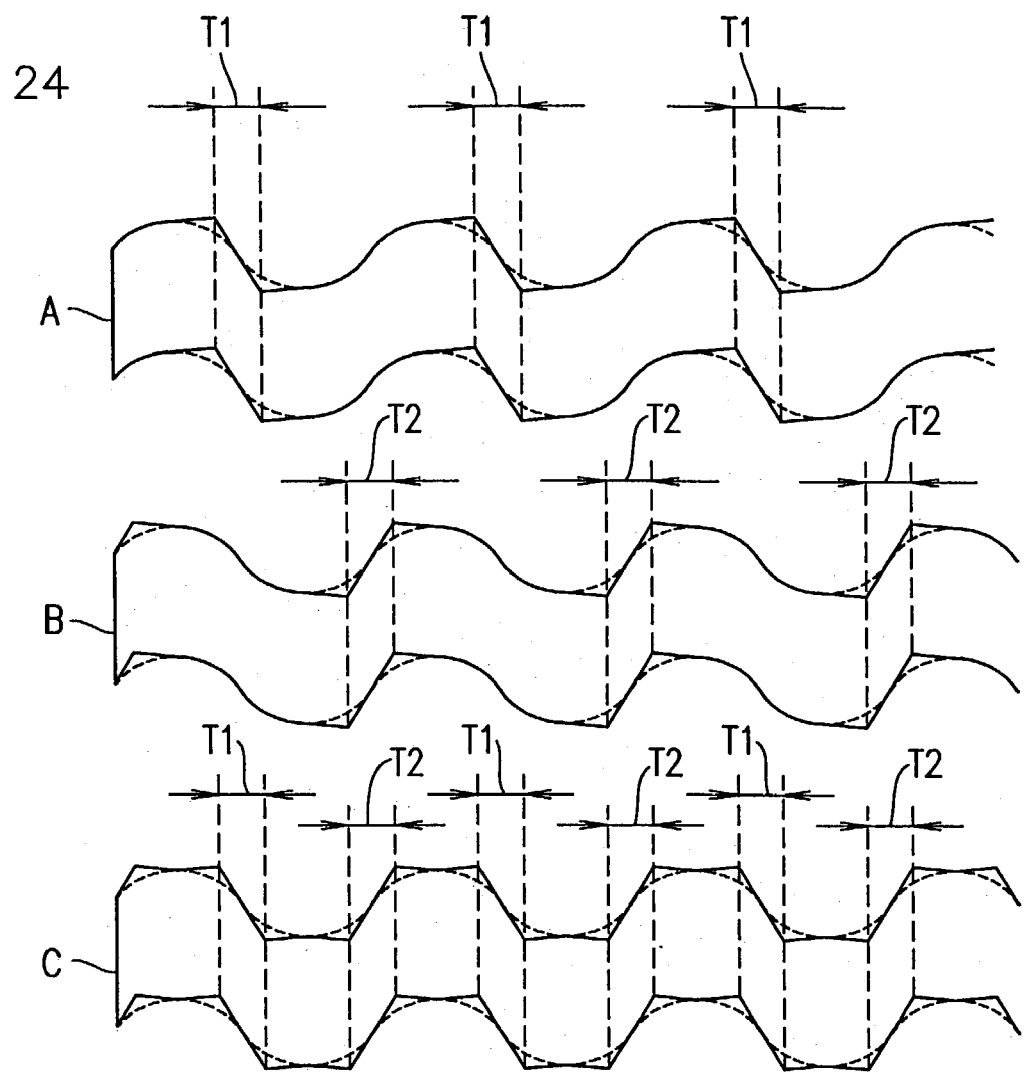
FIGS. 24–28 are diagrams each explaining the oscillation of grooves formed in still another optical disk according to Embodiments 1 and 2.
Figure 26:
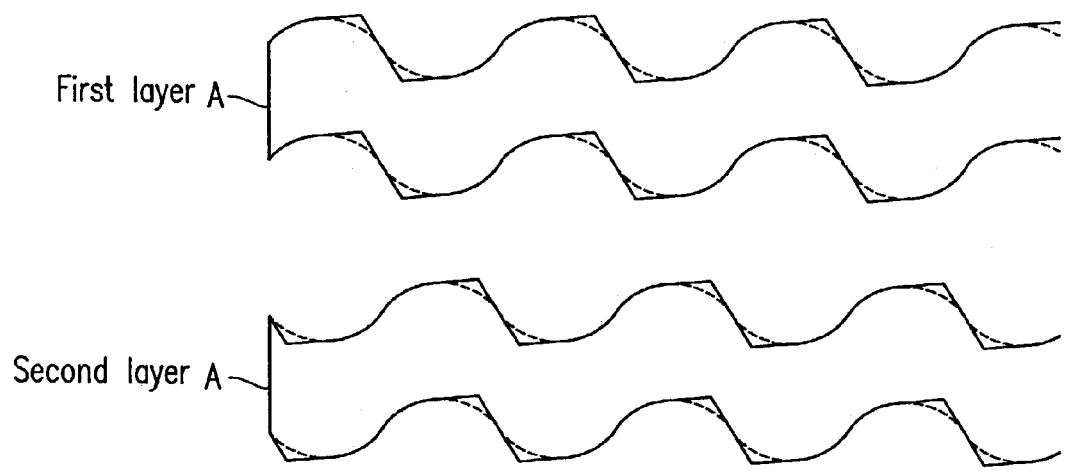
Figure 27:
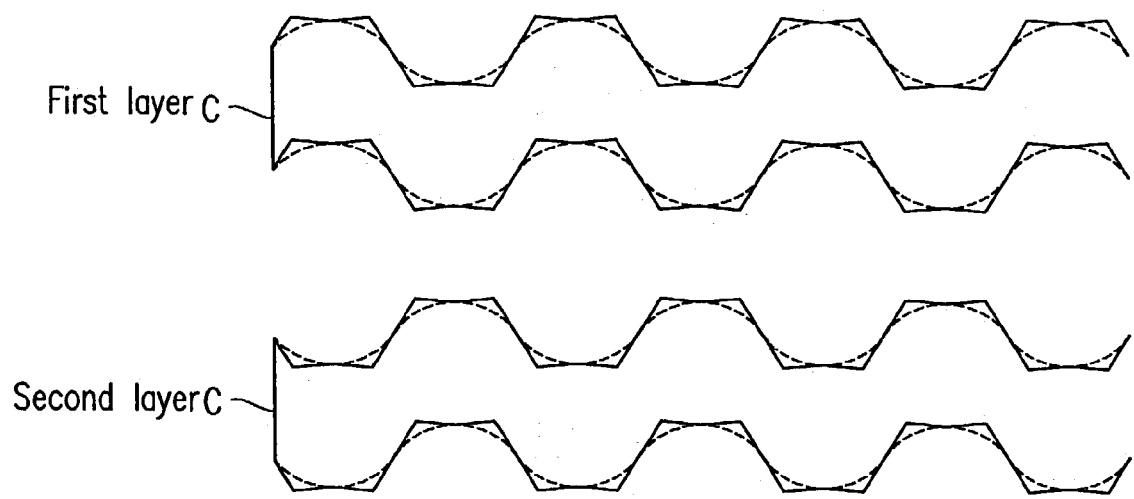
Figure 28:
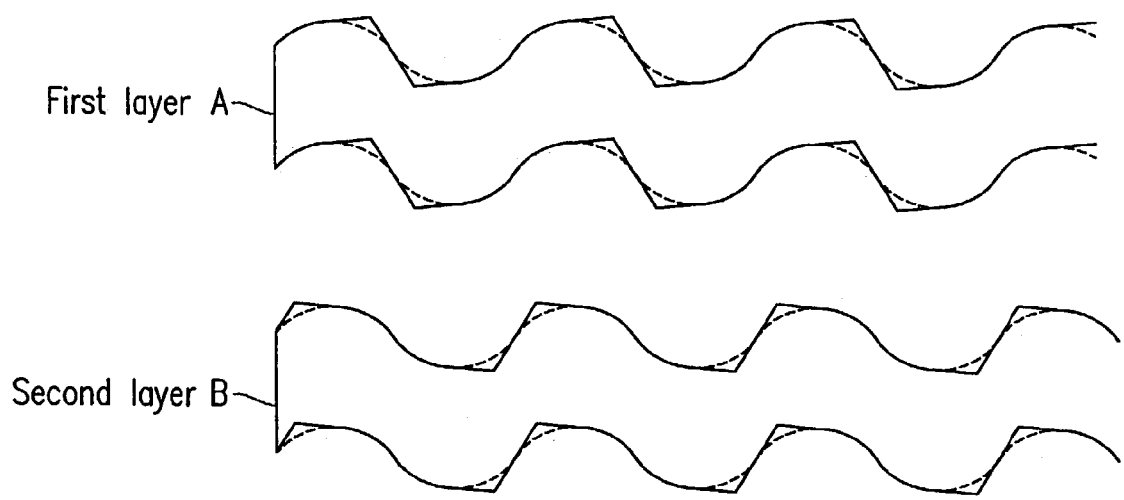
Figure 29:
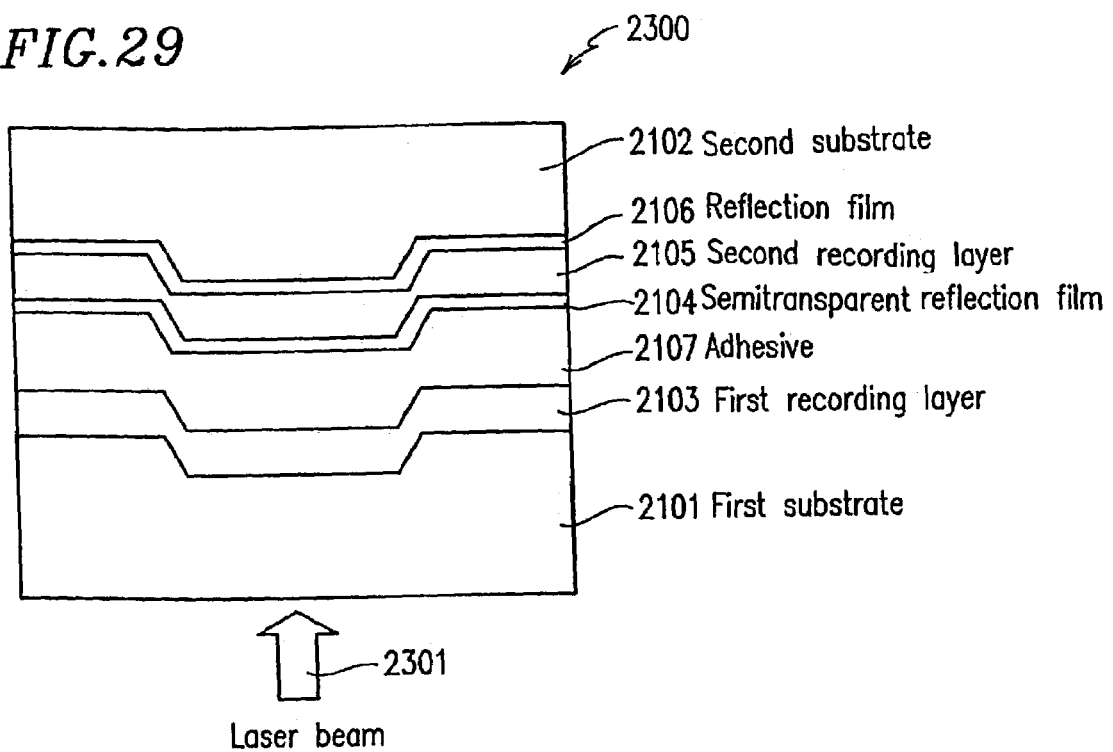
FIG. 29 is a cross-sectional view of an optical disk described in a conventional example.
Figure 31:
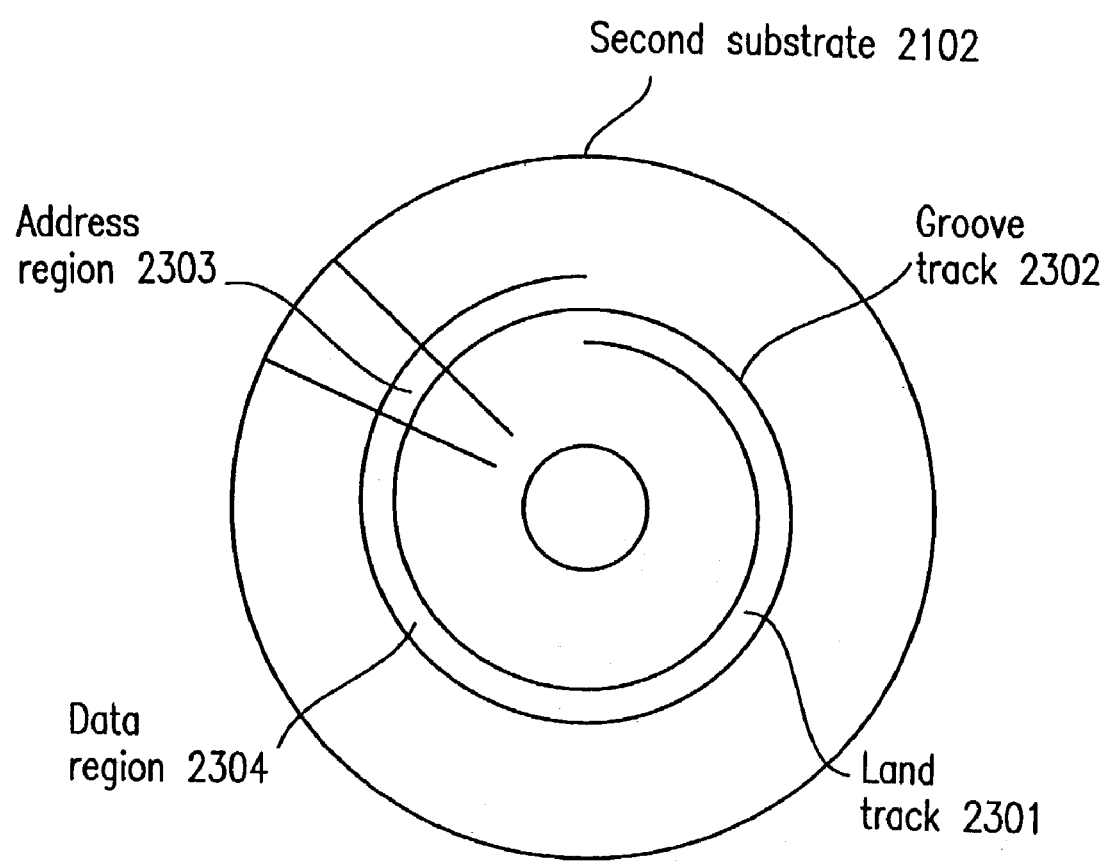
FIG. 31 is a plan view of a substrate included in a conventional optical disk.
Figure 32:
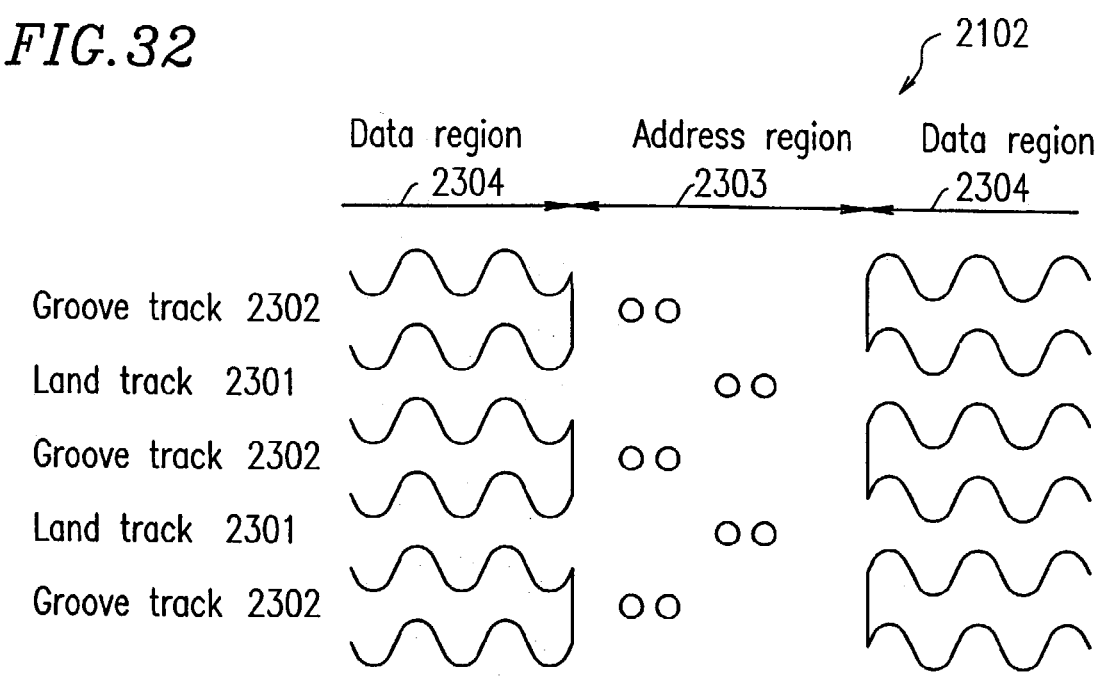
FIG. 32 is a diagram for explaining the oscillation of grooves formed in the conventional optical disk.

Further, in Embodiments 1 and 2, although the tracks oscillate sinusoidally, the form of the oscillation is not limited to this. Any form of the oscillation differing from the sinusoidal oscillation can be employed so long as the oscillation is cyclical. FIG. 24 shows an example of such a case. As shown in FIG. 24, track A becomes linear in periods T1 in the vicinity of a phase at 180 degrees, track B becomes linear in periods T2 in the vicinity of a phase at 0 degrees, and track C becomes linear in both periods T1 in the vicinity of a phase at 0 degrees and periods T2 in the vicinity of a phase at 180 degrees. With respect to these tracks, as shown in FIGS. 25, 26 and 27, although it is possible to discriminate recording layers (first and second layers) by detecting the phases in the above-described manner, as shown in FIG. 28, a different track pattern can be employed for each of the recording layers (first and second layers) while keeping uniform phases. In track A where edges become sharp in a phase at 180 degrees and track B where edges become sharp in a phase at 0 degrees, the polarity at the edge portions are inversed, for example, when a tracking signal is differentiated, thereby identifying the patterns.

Furthermore, in FIG. 10, although patterns corresponding to the codes "S", "0" and "1" are provided in each address region using pits, the present invention is not limited to this. Patterns can be provided in the tracks, rather than the address regions, for example, such that one track corresponds to the code "S", another track corresponds to the code "0" and still another track corresponds to the code "1". By providing the tracks so as to correspond to the codes, the necessity for providing the address regions in which the patterns corresponding to the codes "S", "0" and "1" are provided using the pits is removed, and therefore it is possible to provided less address regions, thereby increasing the capacity of an optical disk.

INDUSTRIAL APPLICABILITY

As described above, according to the present invention, it is possible to readily discriminate between first and second substrates at the time a focus or tracking operation is performed by the servo means, and therefore even when there is data about a layer in a lead-in region provided at the innermost circumference of a disk, it is not necessary to reproduce such data, whereby it is possible to shorten the time period required for reproducing data from the lead-in region.

Further, according to the present invention, it is possible to readily discriminate between the first and second substrates at the time a focus or tracking operation is performed by the servo means, and therefore it is possible to shorten the time period required for reproducing data from an address region of a substrate on which a servo means is performing an operation.

Furthermore, according to the present invention, it is not necessary to reproduce data from the lead-in region or the address region so as to discriminate between the substrates, and it is possible to set the irradiation power of a laser beam so as to be equal to or lower than the lowest irradiation power for reproducing data from the respective regions so long as wobble polarities can be discriminated, thereby eliminating the risk of damaging data at the data region or the address region in a recording region.

Further still, by employing combinations of the embodiments of the present invention, it is possible to improve precision in discrimination of the substrates.

What is claimed is:

1. A recording medium which is circular and has first and second recording layers, wherein:
   the first and second recording layers each include first and second tracks extending concentrically or spirally;
   the first and second tracks each include first and second sectors;
   the first sector includes first and second regions;
   the second sector includes third and fourth regions;
   first and second grooves are formed in each of the second and fourth regions, the first and second grooves extending concentrically or spirally and oscillating sinusoidally;
   oscillation of the first groove has a first oscillation characteristic at a first prescribed position in the second region;
   oscillation of the second groove has a second oscillation characteristic at a second prescribed position in the fourth region; and
   the first and second oscillation characteristics are different from each other.

2. A recording medium according to claim 1, wherein the first oscillation characteristic includes a first phase and the second oscillation characteristic includes a second phase.

3. A recording medium according to claim 2, wherein the first and second phases are different from each other by substantially 180 degrees.

4. A recording medium according to claim 1, wherein the oscillations of the first and second grooves respectively have a minimum amplitude at the first and second prescribed positions.

5. A recording medium according to claim 1, wherein the oscillations of the first and second grooves respectively have a maximum amplitude at the first and second prescribed positions.

6. A recording medium according to claim 1, wherein readout light is incident on the first and second recording layers from the same incident surface.

7. A recording medium according to claim 1, wherein:
   the first track further includes a third sector;
   the second track further includes a fourth sector;

the first region included in the first sector is a first address region;

the third region included in the second sector is a second address region;

the third sector includes a third address region;

the fourth sector includes a fourth address region;

the first and third sectors form a first address block;

the second and fourth sectors form a second address block;

the first address block has first address information representing an address of the first address block;

the first address information is formed by combining a first code recorded in the first address region and a second code recorded in the third address region;

the second address block has second address information representing an address of the second address block; and the second address information is formed by combining a third code recorded in the second address region and a fourth code recorded in the fourth address region.

8. A recording medium according to claim 1, wherein the first oscillation characteristic includes a first cycle and the second oscillation characteristic includes a second cycle.

9. A recording medium according to claim 8, wherein:
readout light is incident on the first and second recording layers from the same incident surface;
a distance between the first recording layer and the incident surface is greater than a distance between the second recording layer and the incident surface; and
the first cycle is greater than the second cycle.

10. A recording medium according to claim 1, wherein the first oscillation characteristic includes a first amplitude and the second oscillation characteristic includes a second amplitude.

11. A recording medium according to claim 10, wherein readout light is incident on the first and second recording layers from the same incident surface, a distance between the first recording layer and the incident surface is greater than a distance between the second recording layer and the incident surface, and the first amplitude is greater than the second amplitude.

12. A recording medium according to claim 1, wherein the first region includes an address region in which information representing an address of the first sector is recorded and the third region includes an address region in which information representing an address of the second sector is recorded.

13. A recording medium according to claim 1, wherein the first region includes a first pit region representing an end of the first sector and the third region includes a second pit region representing an end of the second sector.

14. A recording medium according to claim 13, wherein:
the first groove has a first inner circumference sidewall formed on an inner circumference side of the recording medium and a first outer circumference sidewall formed on an outer circumference side of the recording medium;
the second groove has a second inner circumference sidewall formed on the inner circumference side of the recording medium and a second outer circumference sidewall formed on the outer circumference side of the recording medium;
the first pit region is provided at on the side surface of the first inner circumference sidewall; and
the second pit region is provided on the side surface of the second outer circumference sidewall.

15. A recording medium which is circular and has first and second recording layers, wherein:

the first and second recording layers each include first and second tracks extending concentrically or spirally;

the first and second tracks each include first and second sectors;

the first and second sectors each include first and second pit regions respectively representing ends of the first and second sectors and first and second data regions;

first and second grooves are formed in each of the first and second data regions, the first and second grooves extending concentrically or spirally and oscillating sinusoidally;

the first groove includes a first inner circumference sidewall formed at an inner circumference side and a first outer circumference sidewall formed at an outer circumference side;

the second groove includes a second inner circumference sidewall formed at the inner circumference side and a second outer circumference sidewall formed at the outer circumference side;

the first pit region is provided on the side surface of the first inner circumference sidewall; and the second pit region is provided on the side surface of the second outer circumference sidewall.

16. A reproducing apparatus for reproducing data from a recording medium which is circular and has first and second recording layers, wherein:

the first and second recording layers each include first and second tracks extending concentrically or spirally;

the first and second tracks each include first and second sectors;

the first sector includes first and second regions;

the second sector includes third and fourth regions;

first and second grooves are formed in each of the second and fourth regions, the first and second grooves extending concentrically or spirally while oscillating sinusoidally;

oscillation of the first groove has a first oscillation characteristic at a first prescribed position in the second region;

oscillation of the second groove has a second oscillation characteristic at a second prescribed position in the fourth region;

the first and second oscillation characteristics are different from each other; and the reproducing apparatus includes:
an optical head for irradiating the recording medium with a laser beam and receiving light reflected from one of the first and second grooves so as to generate an electric signal corresponding to the reflection light;
a signal generation means for generating a tracking error signal and a reproduced signal based on the electric signal;
a signal process means for processing the reproduced signal;
a wobble signal extraction means for extracting a wobble signal from the tracking error signal; and
a discrimination means for discriminating, based on the wobble signal, whether the reflection light is light reflected from the first groove or light reflected from the second groove.

17. A reproducing apparatus according to claim 16, wherein the first oscillation characteristic includes a first phase and the second oscillation characteristic includes a second phase.

18. A reproducing apparatus according to claim 17, wherein the first and second phases are different from each other by substantially 180 degrees.

19. A reproducing apparatus according to claim 16, wherein the oscillations of the first and second grooves respectively have a minimum amplitude at the first and second prescribed positions.

20. A reproducing apparatus according to claim 16, wherein the oscillations of the first and second grooves respectively have a maximum amplitude at the first and second prescribed positions.

21. A reproducing apparatus according to claim 16, wherein readout light is incident on the first and second recording layers from the same incident surface.

22. A reproducing apparatus according to claim 16, wherein:
the first track further includes a third sector;
the second track further includes a fourth sector;
the first region included in the first sector is a first address region;
the third region included in the second sector is a second address region;
the third sector includes a third address region;
the fourth sector includes a fourth address region;
the first and third sectors form a first address block;
the second and fourth sectors form a second address block;
the first address block has first address information representing an address of the first address block;
the first address information is formed by combining a first code recorded in the first address region and a second code recorded in the third address region;
the second address block has second address information representing an address of the second address block; and
the second address information is formed by combining a third code recorded in the second address region and a fourth code recorded in the fourth address region.

23. A reproducing apparatus according to claim 16, wherein the first oscillation characteristic includes a first cycle and the second oscillation characteristic includes a second cycle.

24. A reproducing apparatus according to claim 23, wherein:
readout light is incident on the first and second recording layers from the same incident surface;
a distance between the first recording layer and the incident surface is greater than a distance between the second recording layer and the incident surface; and
the first cycle is greater than the second cycle.

25. A reproduction method for reproducing data from a recording medium which is circular and has first and second recording layers, wherein:
the first and second recording layers each include first and second tracks extending concentrically or spirally;
the first and second tracks each include first and second sectors;
the first sector includes first and second regions;
the second sector includes third and fourth regions;
first and second grooves are formed in each of the second and fourth regions, the first and second grooves extending concentrically or spirally and oscillating sinusoidally;
oscillation of the first groove has a first oscillation characteristic at a first prescribed position in the second region;
oscillation of the second groove has a second oscillation characteristic at a second prescribed position in the fourth region;
the first and second oscillation characteristics are different from each other; and
the reproduction method includes the steps of:
irradiating the recording medium with a laser beam and receiving light reflected from one of the first and second grooves so as to generate an electric signal corresponding to the reflection light;
generating a tracking error signal and a reproduced signal based on the electric signal;
processing the reproduced signal;
extracting a wobble signal from the tracking error signal; and
discriminating, based on the wobble signal, whether the reflection light is light reflected from the first groove or light reflected from the second groove.

26. A recording apparatus for recording data on a recording medium which is circular and has first and second recording layers, wherein:
the first and second recording layers each include first and second tracks extending concentrically or spirally;
the first and second tracks each include first and second sectors;
the first sector includes first and second regions;
the second sector includes third and fourth regions;
first and second grooves are formed in each of the second and fourth regions, the first and second grooves extending concentrically or spirally and oscillating sinusoidally;
oscillation of the first groove has a first oscillation characteristic at a first prescribed position in the second region;
oscillation of the second groove has a second oscillation characteristic at a second prescribed position in the fourth region;
the first and second oscillation characteristics are different from each other; and
the recording apparatus includes:
an optical head for irradiating the recording medium with a laser beam and receiving light reflected from one of the first and second grooves so as to generate an electric signal corresponding to the reflection light;
a signal generation means for generating a tracking error signal and a reproduced signal based on the electric signal;
a wobble signal extraction means for extracting a wobble signal from the tracking error signal;
a discrimination means for discriminating, based on the wobble signal, whether the reflection light is light reflected from the first groove or light reflected from the second groove; and
a recording signal generation means for generating a recording signal,
wherein the optical head records the recording signal generated by the recording signal generation means on the recording medium.

27. A recording method for recording data on a recording medium which is circular and has first and second recording layers, wherein:
the first and second recording layers each include first and second tracks extending concentrically or spirally;
the first and second tracks each include first and second sectors;
the first sector includes first and second regions;

the second sector includes third and fourth regions;
first and second grooves are formed in each of the second and fourth regions, the first and second grooves extending concentrically or spirally and oscillating sinusoidally;
oscillation of the first groove has a first oscillation characteristic at a first prescribed position in the second region;
oscillation of the second groove has a second oscillation characteristic at a second prescribed position in the fourth region;
the first and second oscillation characteristics are different from each other; and
the recording method includes the steps of:
irradiating the recording medium with a laser beam and receiving light reflected from one of the first and second grooves so as to generate an electric signal corresponding to the reflection light;
generating a tracking error signal based on the electric signal;
extracting a wobble signal from the tracking error signal;
discriminating, based on the wobble signal, whether the reflection light is light reflected from the first groove or light reflected from the second groove;
generating a recording signal; and
recording the generated recording signal on the recording medium.

* * * * *